United States Patent
Galbreath et al.

(10) Patent No.: US 7,190,159 B2
(45) Date of Patent: Mar. 13, 2007

(54) INTEGRAL HALL EFFECT LIMIT SWITCH FOR CONTROL VALVE STEM POSITION SENSOR

(75) Inventors: Curt Galbreath, Marshalltown, IA (US); Richard J. Winkler, Marshalltown, IA (US); Stephen G. Seberger, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 62 days.

(21) Appl. No.: 10/779,686

(22) Filed: Feb. 18, 2004

(65) Prior Publication Data

US 2004/0183526 A1 Sep. 23, 2004

Related U.S. Application Data

(60) Provisional application No. 60/448,785, filed on Feb. 21, 2003.

(51) Int. Cl.
*G01B 7/14* (2006.01)
(52) U.S. Cl. ............................ 324/207.2; 324/207.2; 324/207.25
(58) Field of Classification Search ........... 324/207.11, 324/207.12, 207.13, 207.2, 207.21–207.26, 324/242–244, 251, 173–174, 207.25
See application file for complete search history.

(56) References Cited

U.S. PATENT DOCUMENTS

| | | | |
|---|---|---|---|
| 2,907,897 A | 10/1959 | Sander | |
| 2,942,177 A | 6/1960 | Neumann et al. | |
| 2,987,669 A | 6/1961 | Kallmann | |
| 2,992,369 A | 7/1961 | Rocca | |
| 3,025,461 A | 3/1962 | Snellen | |
| 3,060,370 A | 10/1962 | Varterasian | |
| 3,112,464 A | 11/1963 | Ratajski et al. | |
| 3,118,108 A | 1/1964 | Zoss et al. | |
| 3,162,804 A | 12/1964 | Parsons | |
| 3,185,920 A | 5/1965 | Brunner | |
| 3,187,254 A | 6/1965 | Wasserman | |
| 3,473,109 A | 10/1969 | Maaz et al. | |
| 3,482,163 A | 12/1969 | Peek et al. | |
| 3,575,054 A | 4/1971 | Glista | |

(Continued)

FOREIGN PATENT DOCUMENTS

DE 4316520 11/1994
WO WO 00/54010 9/2000

OTHER PUBLICATIONS

International Search Report and Written Opinion of the ISA for PCT/US04/004767, issued Jul. 27, 2004.

(Continued)

*Primary Examiner*—Bot LeDynh
(74) *Attorney, Agent, or Firm*—Marshall, Gerstein & Borun LLP

(57) ABSTRACT

A non-contacting position sensor having primary and secondary sensors detects relative displacement between two objects. The secondary sensor may function as a limit switch detection element in a limit switch circuit, and is positioned to be in the path of magnetic flux not detected by the primary sensor. The primary sensor is positioned in a flux path between sections of a flux gathering pole. A secondary sensor is positioned in a leakage flux path outside the first sensor or may be positioned in a secondary flux path.

25 Claims, 15 Drawing Sheets

U.S. PATENT DOCUMENTS

| | | | |
|---|---|---|---|
| 3,777,273 | A | 12/1973 | Baba et al. |
| 3,818,292 | A | 6/1974 | Berman |
| 3,818,326 | A | 6/1974 | Masuda et al. |
| 3,838,263 | A | 9/1974 | Haeusler et al. |
| 3,988,710 | A | 10/1976 | Sidor et al. |
| 4,066,962 | A | 1/1978 | Jaffe |
| 4,086,533 | A | 4/1978 | Ricouard et al. |
| 4,107,604 | A | 8/1978 | Bernier |
| 4,156,191 | A | 5/1979 | Knight et al. |
| 4,204,158 | A | 5/1980 | Ricouard et al. |
| 4,293,837 | A | 10/1981 | Jaffe et al. |
| 4,319,236 | A | 3/1982 | Brace et al. |
| 4,359,677 | A | 11/1982 | Dennon |
| 4,359,685 | A | 11/1982 | Eguchi et al. |
| 4,377,088 | A | 3/1983 | Evert |
| 4,392,375 | A | 7/1983 | Eguchi et al. |
| 4,471,304 | A | 9/1984 | Wolf |
| 4,508,092 | A | 4/1985 | Kiess et al. |
| 4,514,674 | A | 4/1985 | Hollis, Jr. et al. |
| 4,532,810 | A | 8/1985 | Prinz et al. |
| 4,535,289 | A | 8/1985 | Abe et al. |
| 4,544,904 | A | 10/1985 | Tarachand |
| 4,555,120 | A | 11/1985 | Frait et al. |
| 4,570,118 | A | 2/1986 | Tomczak et al. |
| 4,731,579 | A | 3/1988 | Petersen et al. |
| 4,745,363 | A | 5/1988 | Carr et al. |
| 4,791,365 | A | 12/1988 | Johannes et al. |
| 4,810,965 | A | 3/1989 | Fujiwara et al. |
| 4,822,063 | A | 4/1989 | Yopp et al. |
| 4,829,248 | A | 5/1989 | Loubier |
| 4,836,578 | A | 6/1989 | Soltis |
| 4,841,243 | A | 6/1989 | Bishop et al. |
| 4,857,842 | A | 8/1989 | Sturman et al. |
| 4,870,864 | A | 10/1989 | Io |
| 4,893,502 | A | 1/1990 | Kubota et al. |
| 4,901,571 | A | 2/1990 | Reinhardt et al. |
| 4,922,197 | A | 5/1990 | Juds et al. |
| 4,935,698 | A | 6/1990 | Kawaji et al. |
| 4,965,517 | A | 10/1990 | Shelton et al. |
| 4,970,463 | A | 11/1990 | Wolf et al. |
| 4,992,731 | A | 2/1991 | Lorenzen |
| 5,087,879 | A | 2/1992 | Sugifune et al. |
| 5,159,268 | A | 10/1992 | Wu |
| 5,164,668 | A | 11/1992 | Alfors |
| 5,191,284 | A | 3/1993 | Moretti et al. |
| 5,196,794 | A | 3/1993 | Murata |
| 5,216,308 | A | 6/1993 | Meeks |
| 5,270,645 | A | 12/1993 | Wheeler et al. |
| 5,299,451 | A | 4/1994 | Brosse |
| 5,300,883 | A | 4/1994 | Richeson |
| 5,321,355 | A | 6/1994 | Luetzow |
| 5,332,965 | A | 7/1994 | Wolf et al. |
| 5,359,288 | A | 10/1994 | Riggs et al. |
| 5,365,791 | A | 11/1994 | Padula et al. |
| 5,451,923 | A | 9/1995 | Seberger et al. |
| 5,493,216 | A | 2/1996 | Asa |
| 5,493,921 | A | 2/1996 | Alasafi et al. |
| 5,497,081 | A | 3/1996 | Wolf et al. |
| 5,570,015 | A | 10/1996 | Takaishi et al. |
| 5,608,317 | A | 3/1997 | Hollmann |
| 5,670,876 | A | 9/1997 | Dilger et al. |
| 5,694,039 | A * | 12/1997 | Alfors ..................... 324/207.2 |
| 5,729,128 | A | 3/1998 | Bunyer et al. |
| 6,018,241 | A | 1/2000 | White et al. |
| 6,053,529 | A | 4/2000 | Frusti et al. |
| 6,057,682 | A | 5/2000 | McCurley et al. |
| 6,060,881 | A | 5/2000 | Dilger et al. |
| 6,175,233 | B1 | 1/2001 | McCurley et al. |
| 6,232,771 | B1 | 5/2001 | Herden et al. |
| 6,382,226 | B1 | 5/2002 | Larson et al. |
| 6,820,647 | B1 | 11/2004 | Grecco et al. |
| 2004/0085061 | A1 * | 5/2004 | Busch et al. ............. 324/207.2 |

OTHER PUBLICATIONS

Fieldvue® DVC6000 Series Digital Valve Controllers Instruction Manual Form 5647, Dec. 2003 (first copyright/publication 2001).

Fieldvue® DVC5000f Series Digital Valve Controllers for FOUNDATION fieldbus Instruction Manual Form 5445, Jul. 2003 (first coypright/publication 1999).

Westlock, The Precision on Non-Contact Position Feedback, ICoT, The First Proximity Positioner (understood to be publicly available before Feb. 21, 2002).

Smar, FY 301 Smart Valve Positioner Operation & Maintenance Instruction Manual, Nov. 2002.

Westlock, ICoT® "Proximity Positioner" Non-Contact Position Feedback. Westlock Nov. 2002.

International Preliminary Report on Patentability received in International (PCT) Application PCT/US2004/004767, issued Aug. 26, 2005.

Written Opinion for Application PCT/US2004/004767, issued Aug. 26, 2005.

* cited by examiner

FIG. 2B
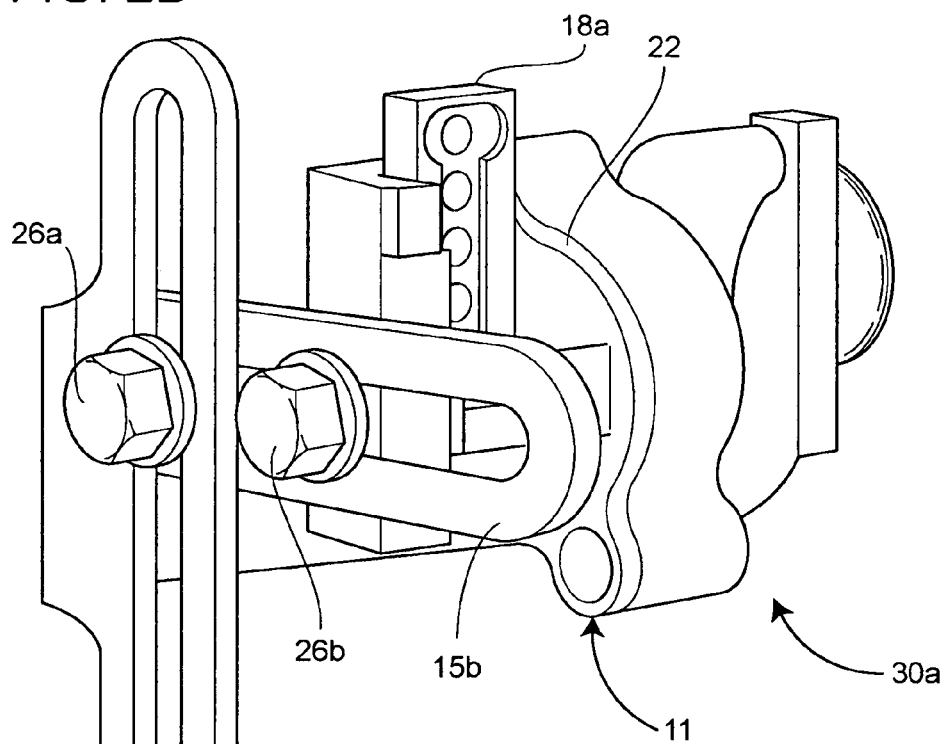
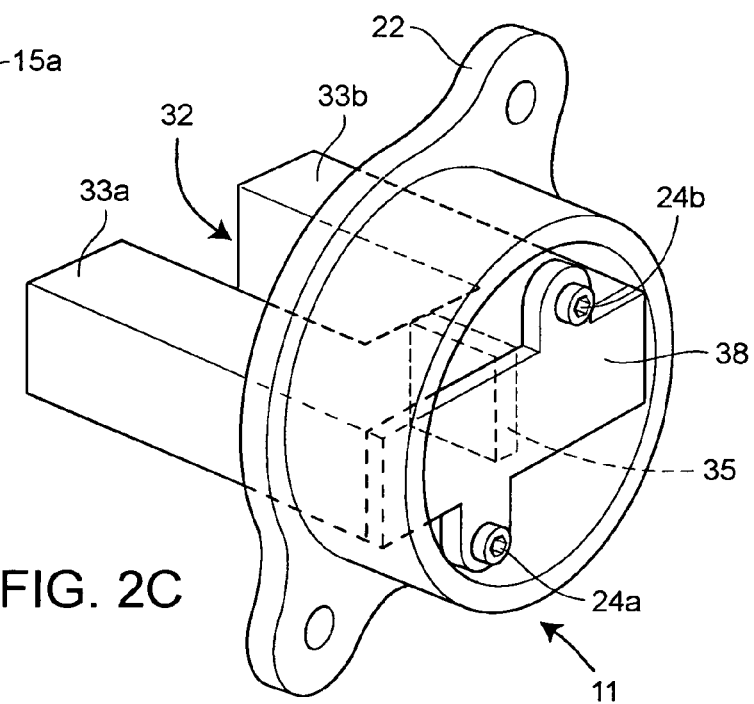
FIG. 2C

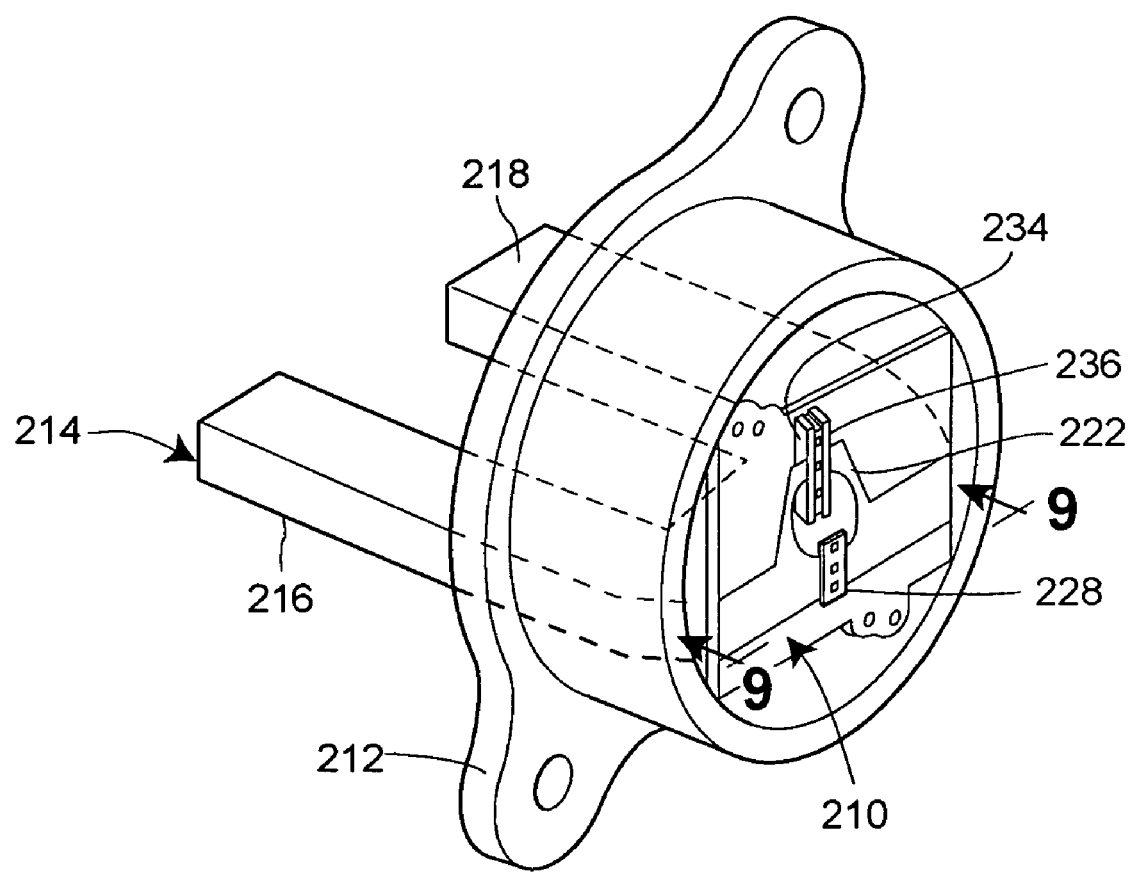

Magnet Holder Travel vs Output of Primary Hall Sensor (Allegro 3516LUA) and a Second placed end to end with the Primary. Second sense element just outside the air gap between the poles. Magnet array is 2.5 inch 14 magnet #A14-6 Version 1.3 Calibration

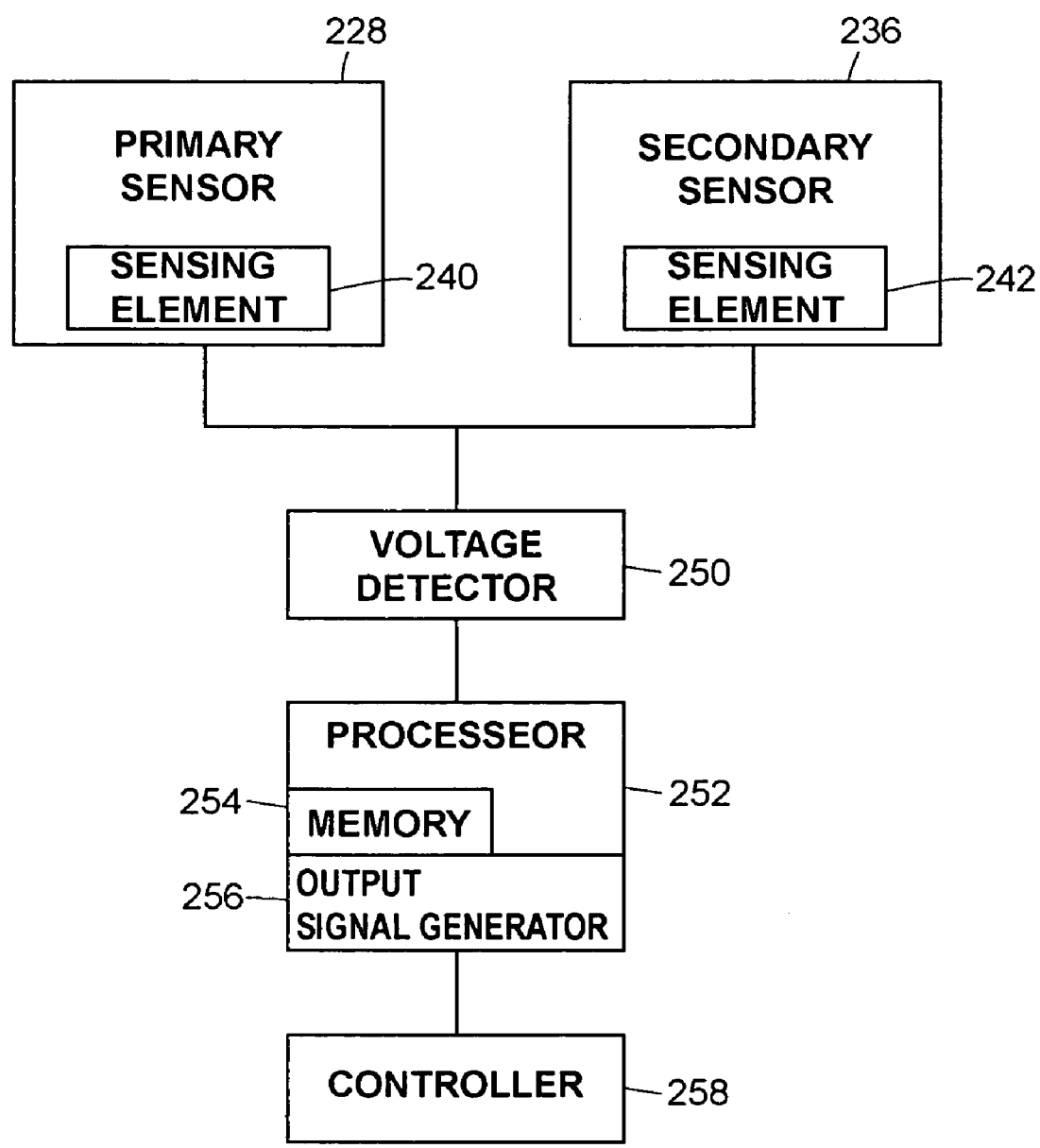

INTEGRAL HALL EFFECT LIMIT SWITCH FOR CONTROL VALVE STEM POSITION SENSOR

REFERENCE TO RELATED APPLICATIONS

This disclosure claims priority to, and is entitled to the benefit of, U.S. Provisional Patent Application No. 60/448,785, filed Feb. 21, 2003 for all subject matter commonly disclosed therein.

FIELD OF TECHNOLOGY

This disclosure relates generally to an apparatus for measuring displacement or position between two objects and, more specifically, to a non-contacting position sensor having a primary configurable magnetic flux source that acts as a primary sensor and a secondary sensor associated with the primary sensor, which are used to detect valve stem position on a control valve.

BACKGROUND

Industrial processing plants use control valves in a wide variety of applications from controlling product flow in a food processing plant to maintaining fluid levels in large tank farms. Control valves, which are typically automated, are used to manage the product flow by functioning like a variable orifice or passage. By moving an internal valve component, the valve plug, the amount of product passing through valve body can be accurately controlled. The control valve is typically automated using an actuator and a remotely operated instrument which communicates between a process control computer and the actuator to command flow changes within the valve to achieve the plant operators' desired control strategy. Position sensors play a critical role in maintaining accurate process control.

When the process control computer issues a command to modify flow, the remotely operated instrument must read the present valve position and apply appropriate corrective action through the actuator. A typical actuator is driven by a pressurized air source, which is controlled by the remotely operated instrument. For example, in a spring and diaphragm actuator used on a sliding stem valve, variations in air pressure applied to a large diaphragm cause movement or displacement of the diaphragm. Attached to the diaphragm is an actuator stem, which in turn is connected to the valve plug. By changing air pressure to the diaphragm, the remotely operated instrument can directly position the valve plug and therefore control flow through the control valve. In order to properly control flow, the instrument must always know where the valve plug is and to where it must move in response to the new command. This is accomplished by attaching a position sensor between the remotely operated instrument and the actuator stem. The output of the position sensor may be directly connected to the remotely operated instrument to provide stem position feedback for precise valve control.

Traditional position sensors, such as potentiometers or other electro-mechanical limit switches, require dynamic or moving mechanical linkages to couple movement or displacement into the sensor. Such electro-mechanical limit switches are mounted on the actuator, and are tripped by a moving element when that element is located at mid-stroke, or at either end of the travel of the valve plug. The signals from the limit switch (or switches) are used to operate relays, solenoid valves, or to trigger alarms. In order to avoid damage to the control element, such as in high thrust valve applications, the limit switches can be placed in locations such that movement of the valve stem does not exceed its desired travel length.

In applications where mechanical vibrations caused by turbulent flow exist, system errors or instabilities can reduce the position sensor's reliability by causing millions of operational cycles to accumulate in a very brief time period. The mechanical linkages also have contact or wear points. During rugged service conditions, instabilities can literally "saw apart" the mechanical linkages at the wear points thereby disconnecting the valve stem from the remotely operated instrument. Catastrophic failures of this type destroy valve control and must be avoided. To improve sensor reliability, sensor designs have migrated to non-contacting position detection methods.

One type of non-contacting sensor design is a magnetic position sensor. Magnetic position sensors detect displacement between two objects by attaching a magnetic flux source, typically a magnet, to the first object and a sensor, such as a Hall Effect sensor to the second object. The magnetic flux source presents a magnetic field that is detected by the sensor. Any movement by one or both objects producing relative displacement presents a different portion of the magnetic field to the sensor, thereby changing the output of the sensor. This output can be directly related to the relative displacement between the actuator and the valve stem.

Non-contact position sensors are very adaptable and can measure numerous forms of displacement. However, current non-contacting position sensors are often limited by the method of attaching them to the moving elements. There are numerous commercial examples of position or feedback sensors in remotely operated instruments that still use "contacting" dynamic linkages to couple displacement. One such configuration uses a conventional worm-gear apparatus to directly couple rotary motion to a-non-contacting magneto-resistive element. Although the magneto-resistive element can be classified as a non-contacting sensor, the motion is actually transduced through a "contacting" apparatus and will suffer from decreased reliability just like traditional linkage-based potentiometers.

Additionally, other non-contact position sensors suffer from the inability to reconfigure the magnet flux source to provide a predefined output for various types of displacement measurement (e.g. rectilinear and rotary). Examples of these types of position sensors are found in Riggs et al. U.S. Pat. No. 5,359,288, Wolf et al. U.S. Pat. No. 5,497,081, and Takaishi et al. U.S. Pat. No. 5,570,015.

Additional shortcomings of existing non-contact position sensors include the need for at least two such limit switches to detect opposite ends of travel of the valve plug, the difficulty of implementing such limit switches, and concern for their reliability. The manner in which these and other shortcomings of existing proximity sensors are overcome will be explained in the following Summary and Detailed Description of the Preferred Embodiments.

SUMMARY

A position sensor assembly as described herein provides a non-contact position for accurately detecting the relative displacement between two objects and more specifically to precisely measure the position of a valve plug in a control valve assembly.

A limit switch with a highly configurable magnetic flux source utilizes a plurality of discrete magnets and is adapted to measure both rectilinear displacement or rotary displacement. This is accomplished through controlled design of a magnetic assembly. Individual magnets are assembled to create a continuous compound flux field thereby creating a variable physical geometry magnetic flux source. A U-shaped pole piece, including two L-shaped sections, is employed which couples flux from the magnetic flux source to a Hall Effect element, or primary sensor, positioned between the L-shaped sections of the U-shaped pole piece.

A secondary sensor is further employed, which operates in conjunction with, and preferably in a proportional manner to, the primary sensor. In one embodiment, a U-shaped pole piece of a Hall Effect proximity sensor is adapted such that the two L-shaped sections are each provided with an asymmetric Y-shaped portion to accommodate both primary and secondary sensors. The primary sensor interfaces directly with the end surface of the U-shaped pole piece on a first end of the Y-shaped portions. The secondary sensor is coupled, through an adapter, to a second end of the Y-shaped portions.

The adapter creates a gap, referred to herein as an air gap, between the secondary sensor and the second ends of the Y-shaped portions. The air gap creates a lossy magnetic coupling to the secondary sensor. By varying the spacing in the air gap, one can proportionately control the magnitude of the flux experienced by both the primary and secondary sensors. While the adapter is preferably an electrically insulating material, such as plastic, it is recognized that the air gap may instead be open space, i.e. air or other material, without altering the flux through the secondary sensor.

In alternate embodiments, the secondary sensor is positioned adjacent to the primary sensor, and is aligned in an axis that is perpendicular to the plane of the U-shaped pole piece, or is oriented perpendicularly to the Hall Effect element of the primary sensor and placed in intimate contact with the bottom surface of the U-shaped pole piece. These various embodiments are shown in the following views of the drawing:

BRIEF DESCRIPTION OF THE SEVERAL VIEWS OF THE DRAWING

FIG. 2B is a perspective view of the complete non-contact position sensor assembly of FIG. 2A showing the interconnection between the magnetic flux source and the non-contact position sensor assembly.

FIG. 2C is a perspective view of the sensor housing and sensor assembly for the rectilinear non-contact position sensor.

FIG. 8 is a perspective view of a sensor housing and sensor assembly for a non-contact position sensor in accordance with the present invention;

FIG. 13 is a schematic representation of a system in which voltage outputs of the primary and secondary Hall Effect sensors are detected, analyzed by a processor, compared to data stored in a memory thereof, and from which output signals may be supplied to a controller.

DETAILED DESCRIPTION OF THE PREFERRED EMBODIMENTS

To appreciate the advantages of the position sensor described herein, it is desirable to have an understanding of a position sensor's components and how they operate to measure displacement on a control valve. Although the preferred embodiment teaches displacement measurement related to control valves, those skilled in the art will recognize the relevance to other displacement measurement applications as well. Turning to the drawings and referring initially to FIG. 1A, the key components of the non-contact position sensor are shown.

Figure 1A:
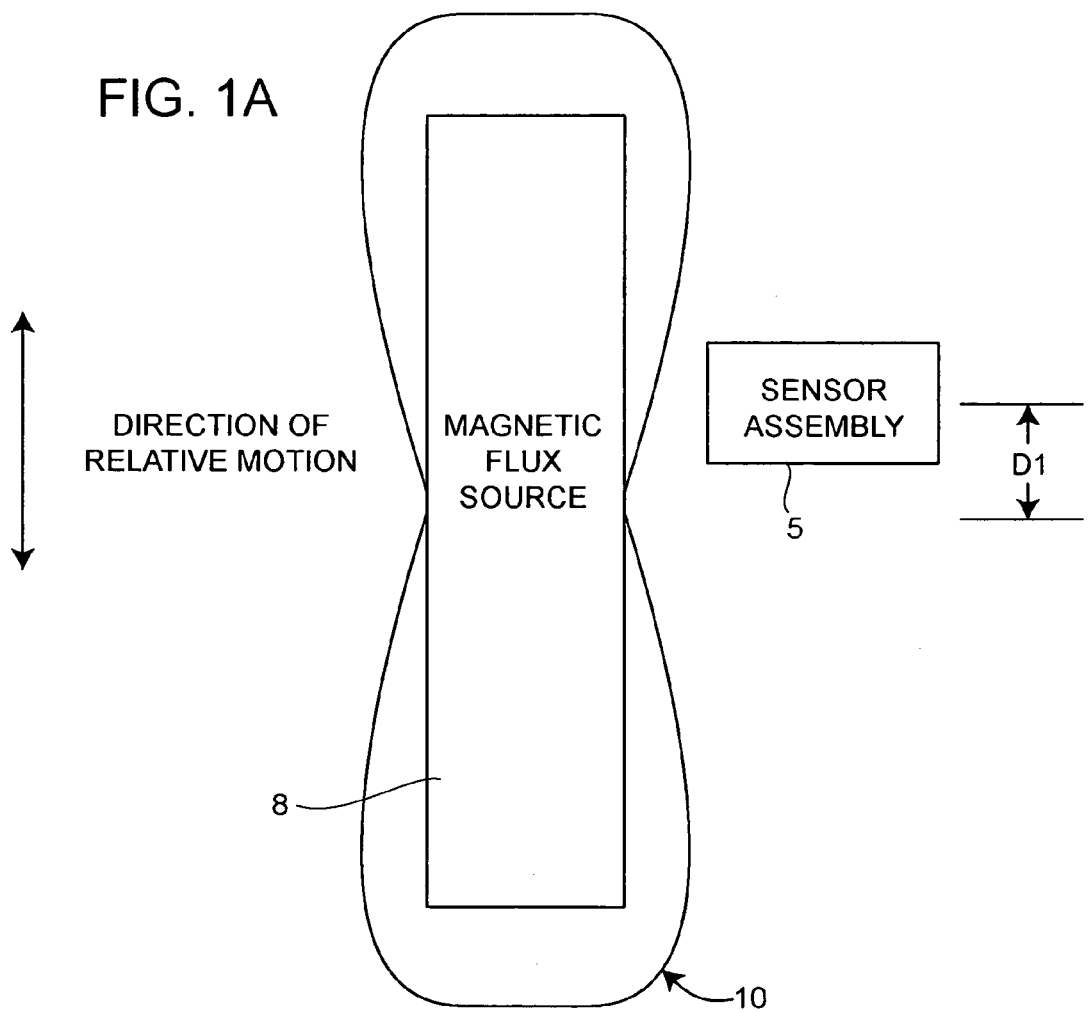
FIG. 1A shows a block diagram illustrating a cross-sectional view of a magnetic sensor positioned near the center of a magnetic flux source.
Figure 1C:
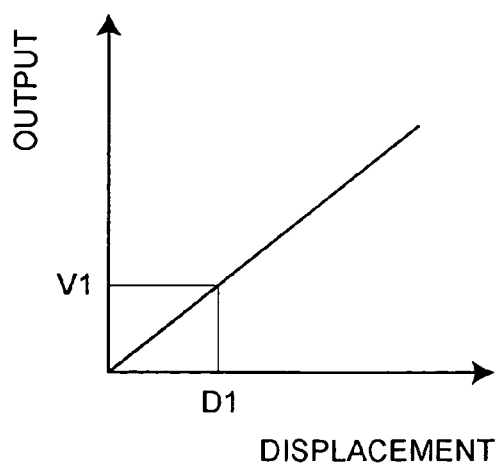
FIG. 1C is a graph illustrating the magnetic sensor output corresponding to FIG. 1A.

In FIG. 1A, the sensor 5 is placed adjacent to the magnetic flux source 8. As commonly known, the magnetic flux source 8 presents a continuous, three-dimensional flux field that completely envelopes both the magnetic flux source 8 and the sensor 5. Continuing, the sensor 5 is a device that produces an electrical signal that is proportional to the magnetic field 10 that surrounds it. As known to those skilled in the art, the detected magnitude of the magnetic field 10 changes with respect to position within the magnetic field 10. Consequently, any change in relative position or displacement of the sensor 5 with respect to magnetic field 10 will produce a corresponding change in the sensor's 5 output as is illustrated in the graph of FIG. 1C. This relationship can be exploited to create a non-contact position sensor.

Figure 1B:
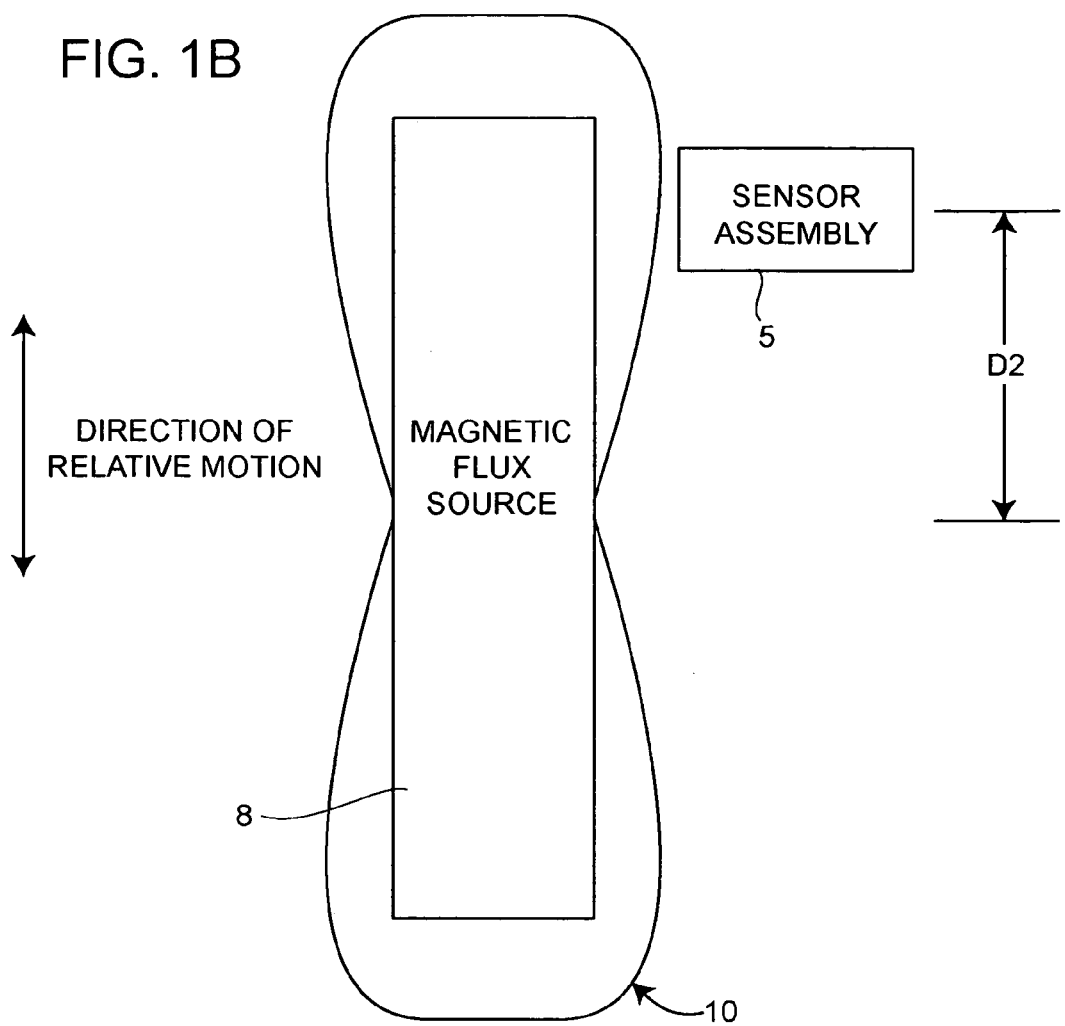
FIG. 1B shows a block diagram illustrating a cross-sectional view of the magnetic sensor of FIG. 1A positioned near one end of the magnetic flux source.
Figure 1D:
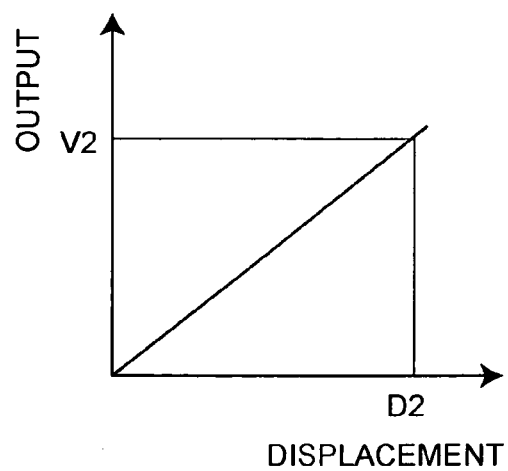
FIG. 1D is a graph illustrating the magnetic sensor output corresponding to FIG. 1B.

In non-contacting position or displacement measurement applications, the sensor 5 and the magnetic flux source 8 are mounted on two mechanically independent objects (not shown). No dynamic or moving mechanical linkages are used to couple the relative displacement between the magnetic flux source 8 directly into the sensor 5. Referring again to FIG. 1A, the relative position of the sensor 5 and the magnetic flux sensor 8 places the sensor 5 near the center of the magnetic flux source 8 with a displacement indicated by D1. The corresponding graph in FIG. 1C shows the sensor 5 output indicated by V1 for a displacement of D1. In FIG. 1B, the displacement is changed to a new position, indicated by D2 placing the sensor 5 near the end of the magnetic flux source 8. The corresponding graph in FIG. 1D shows the change in the sensor 5 output directly related to the change in position of the sensor 5 within the magnetic field 10 generated by the magnetic flux source 8, V2. These changes in the sensor 5 output signal are used as a direct measurement of the displacement between the two mechanically independent objects. An electronic circuit (not shown) connected to the sensor 5 is used to process the output signal of the sensor 5 for use in control valve applications explained in greater detail below.

Figure 2A:
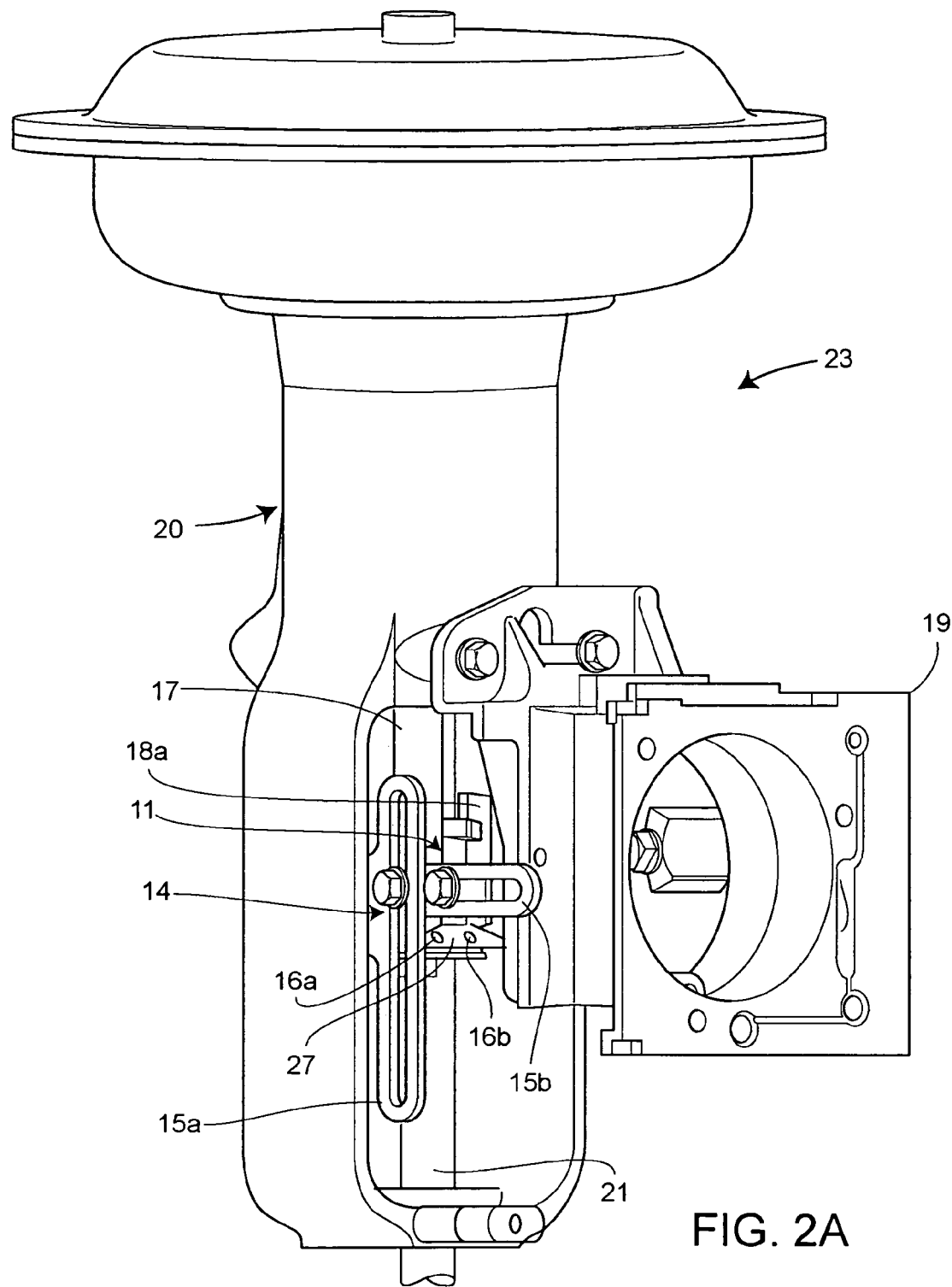
FIG. 2A is a perspective view of a non-contacting position sensor assembly mounted to a sliding stem actuator to detect rectilinear displacement of a valve stem.

Referring now to FIG. 2A, a position sensor is shown coupled to a sliding stem actuator 20 used for automated control of a control valve. The sliding stem actuator 20 is adapted for rectilinear motion (i.e. motion in a straight line). The perspective view of FIG. 2A shows how the position sensor's magnetic sensor assembly 11 and magnetic flux source 18a (shown in greater detail in FIGS. 3–7) are independently mounted between the sliding stem actuator 20 and the remotely operated instrument 19 (only the remotely mounted instruments' module base is shown).

As known, the sliding stem actuator 20, the remotely operated instrument 19, and a control valve (not shown) combine to form the valve assembly 23. A mounting assembly 14 attaches the magnetic flux source 18a to the stem connector 27. The mounting assembly 14 is constructed from a mounting plate 15a and an alignment plate 15b. The stem connector 27 is connected between the actuator stem 17 and the valve stem 21 using stem connector bolts 16a and 16b.

The general operation of a typical valve assembly not equipped with the present position sensor is described in U.S. Pat. No. 5,451,923 and is assigned to Fisher Controls International, Inc. and hereby incorporated by reference. As is known, when a command to move the valve plug is received by the remotely operated instrument 19, pressurized air is directed to the sliding stem actuator 20 and the actuator stem 17 will move. Any displacement of the actuator stem 17 creates a relative change in position of the magnetic flux source 18a with respect to the sensor assembly 11. This position change modifies the sensor output. The output signal is transmitted to the remotely operated instrument 19 for processing to create precise control of the valve plug (not shown). FIG. 2B shows a perspective view of the rectilinear position sensor 30a. The magnetic flux source 18a and the sensor assembly 11 are placed in close proximity to adequately couple the magnetic field 10 (FIG. 1A and FIG. 1B) to the sensor assembly 11, but make no contact during operation.

Now referring to FIG. 2C, The sensor assembly 11 is mounted in the sensor housing 22. The sensor housing 22 provides positional alignment of the flux-gathering pole piece 32 and magnetic sensor 35 (explained in greater detail below). The magnetic sensor 35 and flux-gathering pole piece 32 are held in the sensor housing 22 by a bracket 38 and two screws 24a and 24b. Furthermore, by integrating the sensor housing 22 directly into the remotely operated instrument 19, the electrical connections are simplified and compliant with industrial restrictions for intrinsically-safe and explosion-proof operation in hazardous environments well known to those in the art. The sensor housing 22 is manufactured from aluminum or any other suitable non-magnetic material and is adapted to receive the sensor assembly 11.

Figure 3A:
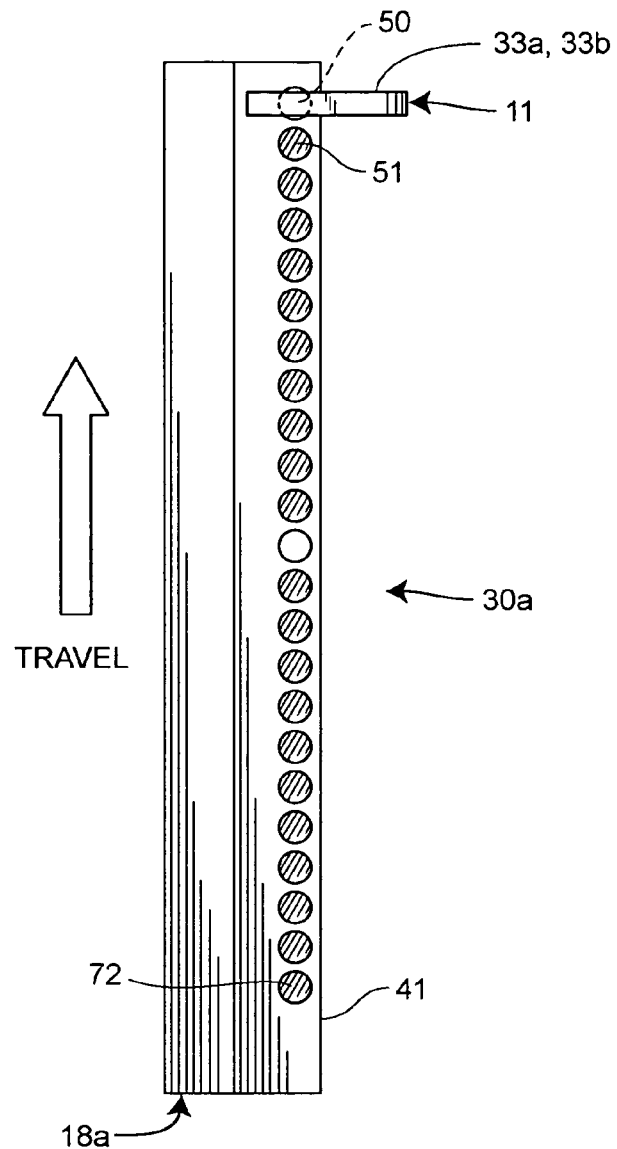
FIG. 3A is a side view of the position sensor showing a magnet flux source containing a plurality of discrete magnets having individual induction values positioned for rectilinear travel.
Figure 3B:
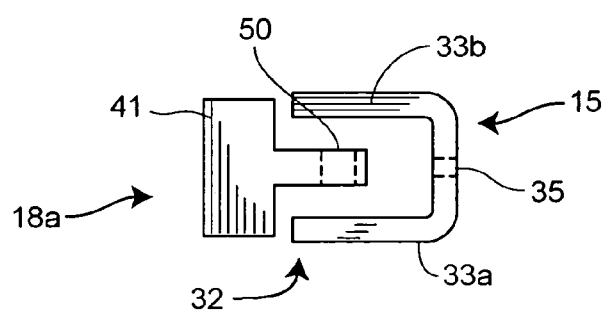
FIG. 3B is a top view of the position sensor of FIG. 3A for rectilinear travel and shows the lateral position and the insertion depth of the magnetic flux source within the sensor assembly.

Referring now to FIG. 3A and FIG. 3B, the magnetic flux source 18a (FIG. 3A) and the sensor assembly 11 (FIG. 3B) in the preferred embodiment are discussed in detail. In the preferred embodiment, the magnetic flux source 18a is designed to measure rectilinear travel and provide a linear output signal over the entire range of displacement measurement. For example, a ten percent change in displacement will produce a corresponding ten percent change in the position sensor's output signal. All changes in position sensor output are in direct proportion to changes in displacement. The linear output relationship is important in the functioning of a remotely operated instrument. By creating a directly proportional measurement of displacement, no additional processing by the remotely operated instrument 19 or the sensor electronics 13 (FIGS. 3C and 3D) is required to provide position feedback.

A plurality of individual or discrete cylindrical magnets 50–72 is assembled in a rectangular-shaped carrier 41 to create the magnetic flux source 18a. The preferred material for the carrier 41 is nonmagnetic such as aluminum or plastic. In the preferred embodiment, twenty-three discrete magnets 50–72 are arranged in the carrier 41 to create a linear array capable of measuring about 4.5 inches of rectilinear travel. The discrete magnets 50–72 are preferably fabricated from ALNICO 8H and aligned vertically and horizontally. In one embodiment, the magnets 50–72 are mounted within the carrier using an epoxy such as 2214 *Structural Adhesive* from 3M of Saint Paul, Minn. Each discrete magnet 50–72 is approximately 0.1875 inches in diameter and 0.1875 inches in length. The center-to-center spacing of the individual magnets in the vertical direction is approximately 0.25 inches providing about 4.5 inches displacement measurement over the central portion of the array. The carrier 41 provides the mechanical alignment of the magnet array and attaches directly to the stem connector 27 with the mounting assembly 14 being attached to the stem connector 27 using stem connector bolts 16a and 16b as previously shown in FIG. 2A.

As understood by one skilled in the art, dimensional tolerance stack-up that occurs during mounting of the remotely mounted instrument 19 on the actuator 20 requires instrument calibration prior to operation of the valve assembly 23. Instrument calibration is facilitated by providing coarse positional alignment along the longitudinal axis of travel and in a plane horizontally perpendicular to the longitudinal axis. Unlike prior art linkages that directly couple motion to the sensor, the mounting plate 15a and alignment plate 15b of mounting assembly 14 are static and only provide adjustment during the installation process. The horizontal alignment of the magnetic flux source 18a and the sensor assembly 11 is further depicted in FIG. 3B.

The top view illustrated in FIG. 3B clearly shows the U-shaped flux-gathering pole piece 32 of the sensor assembly 11. The flux-gathering pole piece 32 is comprised of two L-shaped sections 33a and 33b of high permeability material, preferably annealed HyMu "80"® from Carpenter Technology of Reading, Pa., placed in mirrored opposition of each other. The L-shaped sections 33a and 33b are joined at the base with a gap adapted to receive the magnetic sensor 35 and place each L-shaped section 33a and 33b in intimate contact with the magnetic sensor 35. The square cross-sectional dimension of each L-shaped section 33a and 33b is approximately 0.15 inches. Preferably, each L-shape section 33a and 33b is approximately 1.25 inches in depth and 0.445 inches across the base leg thus creating a U-shape that has external dimensions of approximately 1.25 inches in depth by 0.89 inches in width. In the preferred embodiment, the magnetic sensor 35 is an Allegro 3515 Hall Effect element, but other types of magnetic sensors, including but not limited to an Allegro 3516 Hall Effect element, could be used as well or in addition.

Figure 3C:
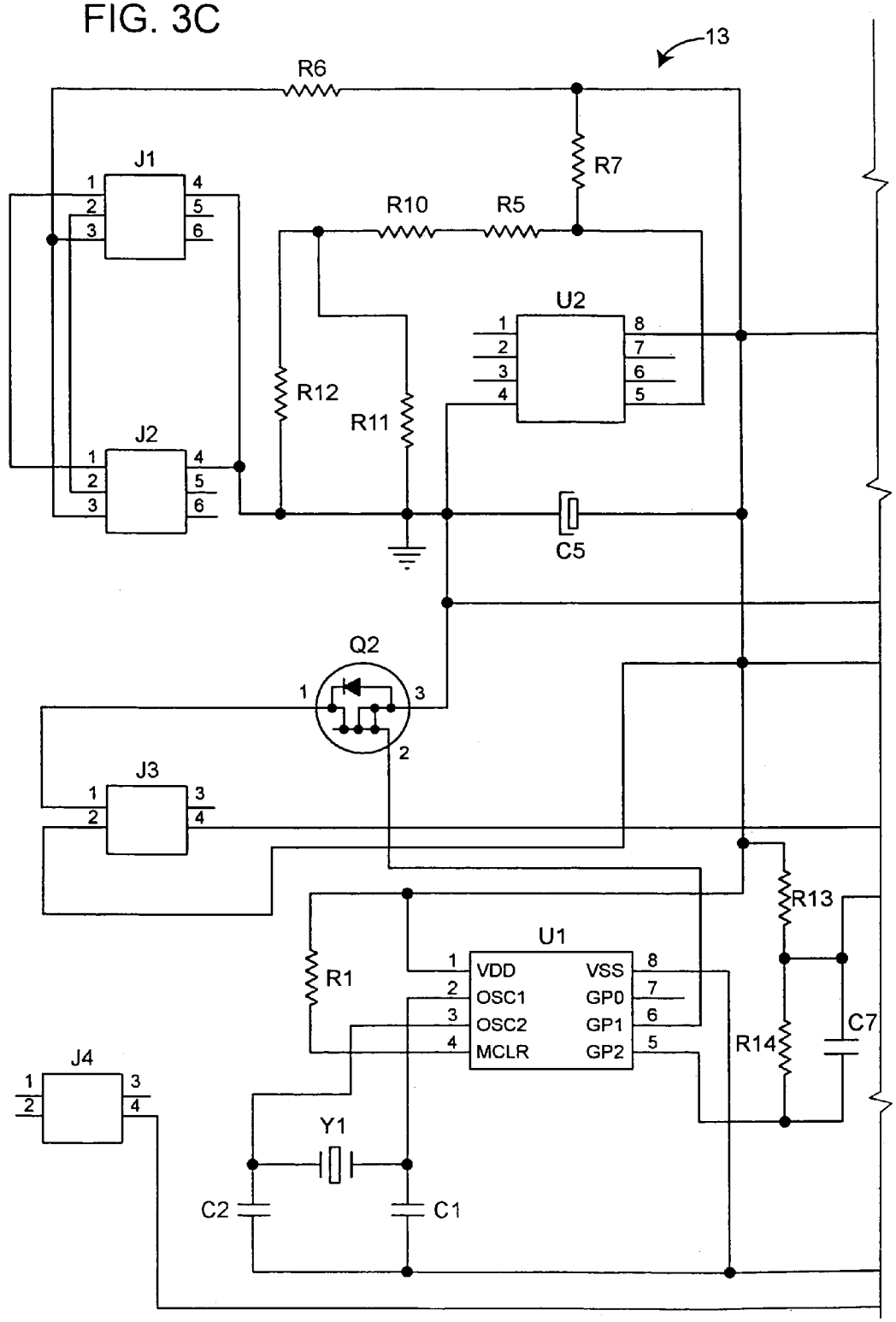
FIGS. 3C and 3D are, combined, a schematic illustrating an electronic circuit that is used to intermittently power the magnetic sensor and condition the pulsed output signal to create an analog signal for use in a remotely operated instrument.
Figure 3D:
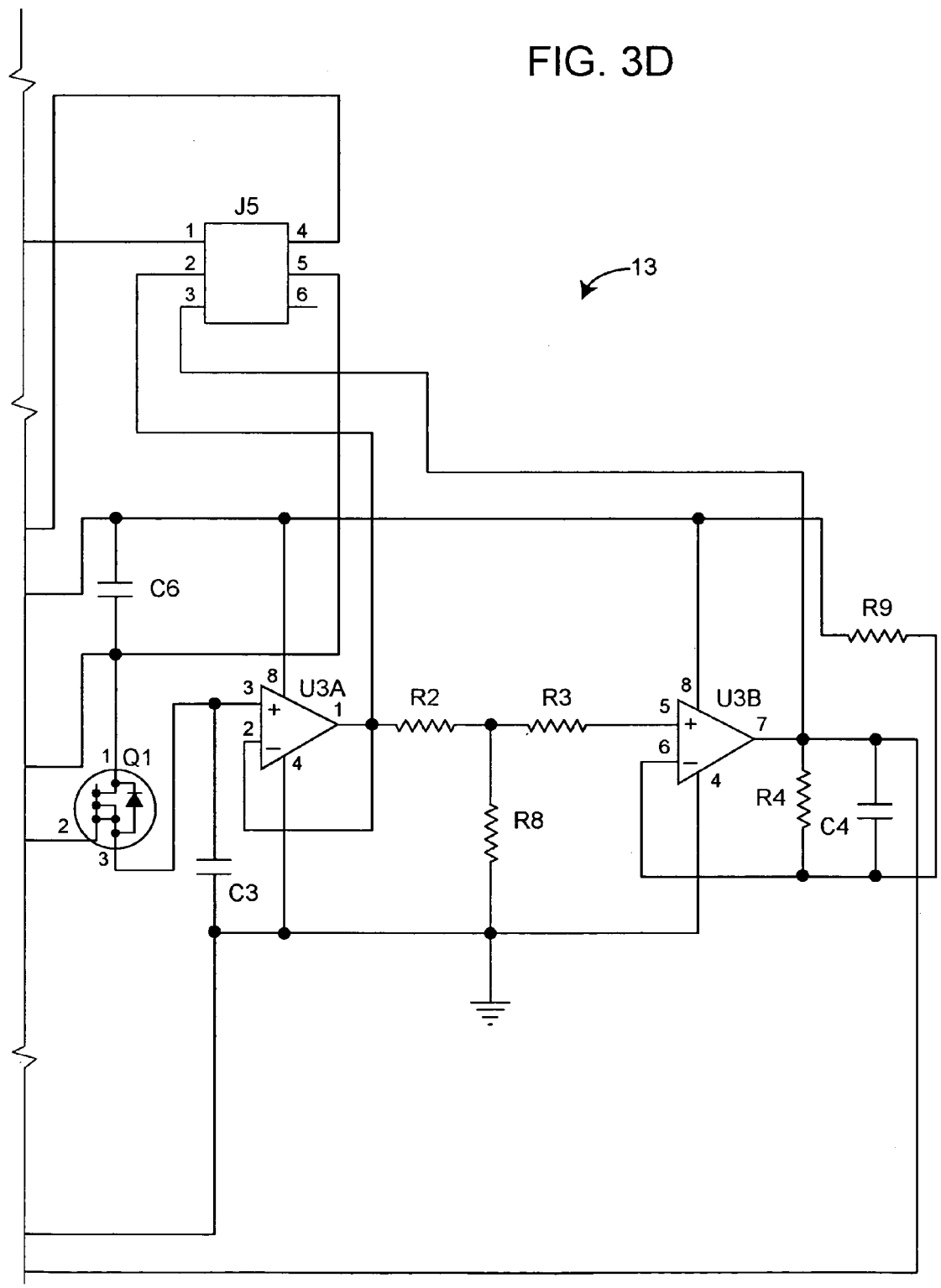

The output of magnetic sensor 35 is processed by the electronic circuit 13 (FIGS. 3C and 3D). The electronic circuit 13 provides the interface between the magnetic sensor 35 and the remotely operated instrument 19. As illustrated in FIG. 3C, a pair of connectors J1 and J2 receive power from an industrial standard 4–20 mA current loop. As understood by those skilled in the art, power for the magnetic sensor 35 and the electronic circuit 13 may be generated from a regulator circuit designed with the LM285 micropower voltage reference diode U2 from National Semiconductor of Santa Clara, Calif. and passive components R5, R6, R7, R10, R11, R12, and C5. The values/designations for these and other components of FIGS. 3C and 3D are illustrated in Table 1.

Powering the circuits intermittently reduces the power consumption of the magnetic sensor 35 and the electronic circuit 13. The magnetic sensor 35 is connected to the electronic circuit through connector J3 and is "power switched" or pulsed at approximately 200 Hertz through an N-channel Field-Effect Transistor (FET) Q2. As understood by those skilled in the art, the embedded controller U1, a PIC12C508A available from Microchip Technology of Phoenix, Ariz. and passive components R1, Y1, C1 and C2 provide the timing and control for pulsed operation. The pulsed output signal from the magnetic sensor 35 must be interpolated or reconstructed to create an analog signal that can be processed by the remotely operated instrument 19. The FET Q1, an operational amplifier U3A (FIG. 3D), and passive components R2, R8, R13, R14, C3, C6, and C7, create a sample and hold circuit to reconstruct the analog signal. An operational amplifier U3B and passive components R3, R4, R9, and C4 condition (i.e. adjust the gain and offset) and filter the reconstructed analog signal to create the final output signal. The final output signal or position displacement measurement is transmitted to the remotely operated instrument 19 through connector J4 (FIG. 3C). Finally, the test connector J5 can provide test signals for diagnostic evaluation for the magnetic sensor 35 and the electronic circuit 13.

TABLE 1

| Component | Value/Designation |
| --- | --- |
| R1 | 100 KΩ |
| R2 | 634 KΩ |
| R3 | 178 KΩ |
| R4 | 86.6 KΩ |
| R5 | 665 KΩ |
| R6 | 24.3 KΩ |
| R7 | 51 KΩ |
| R8 | 221 KΩ |
| R9 | 1 MΩ |
| R10 | 665 KΩ |
| R11 | 15 KΩ |
| R12 | 60.4 KΩ |
| R13 | 2 MΩ |
| R14 | 1 MΩ |
| C1 | 5.1 pFd |
| C2 | 5.1 pFd |
| C3 | 0.47 μFd |
| C4 | 18 pFd |
| C5 | 47 μFd |
| U1 | PIC12C508A |
| U2 | LM285BYM |
| U3 | OP281 |
| Y1 | 131 KHz |
| Q1 | BSS138 |
| Q2 | BSS138 |
| J1 | CONN0611 |
| J2 | CONN0611 |
| J3 | CONN0411 |
| J4 | CONN0411 |
| J5 | CONN0611 |

Continuing to FIG. 4B, the flux-gathering pole piece 32 collects the magnetic field 10 from the magnetic flux source 18a and directs the flux to the magnetic sensor 35 and is discussed in more detail below. The magnetic flux source 18a is mounted approximately perpendicular to sensor assembly 11 such that any relative horizontal displacement does not cause physical contact of the magnetic flux source 18a with the inner legs on the flux-gathering pole piece 32. The magnetic flux source 18a is engaged about 0.3125 inches past the opening of the U-shaped, flux-gathering pole piece 32. An air gap approximately 0.2 inches on each side of the magnetic flux source 18a symmetrically positions the magnetic flux source 18a within the sensor assembly 11.

Each discrete magnet 50–72 produces a magnetic field. As is known, the shape and density of the magnetic field is directly related to several factors. Two of those factors are the induction of the magnet and the magnet's interactions with extraneous magnetic fields. To better understand the unique characteristics of the magnetic flux source 18a, the aforementioned factors are explained in greater detail below.

The induction of the magnet is a direct measure of its inherent magnetic strength and can be controlled or programmed during manufacture. As known, for a given physical geometry of the magnet, an increase in its induction produces a corresponding increase in the strength of the magnet and the density of its magnetic field. By controlling the discrete magnets' induction, its flux density (i.e. the amount of flux in a given volume) and therefore its magnetic field, can be controlled. Also, any additional or extraneous magnetic field not generated by the discrete magnet can be combined with the magnetic field generated by the discrete magnet. The polarity and density of the additional magnetic field can "additively" increase or decrease the magnetic field that surrounds the discrete magnet. The magnetic circuit described herein utilizes both the induction control and the interactions between extraneous magnetic fields to create a programmable magnetic flux source.

Single bar magnets, as demonstrated in prior art, present difficulties when using the entire length of the magnet for displacement measurement. As illustrated in FIG. 4A, the polarization direction or orientation of the magnetic poles in the single bar magnet application is parallel to the direction of travel. This polar orientation establishes highly concentrated magnetic fields 130a and 130b near the poles of the magnet. In these dense flux regions, the repelling forces between the lines of flux create extremely nonlinear changes in the magnetic field. If a single bar magnet is to be used for displacement measurement, special processing by the sensor assembly electronics is required to create a linear output. Alternatively, the length of the magnet could be increased by approximately 75% to negate the nonlinear end effects, but this approach needlessly increases cost and limits position sensor application due to the increase in physical length. In the preferred embodiment, the magnet flux source length can be substantially equal to the maximum displacement to be detected and no special processing of the output signal is required.

Figure 4B:
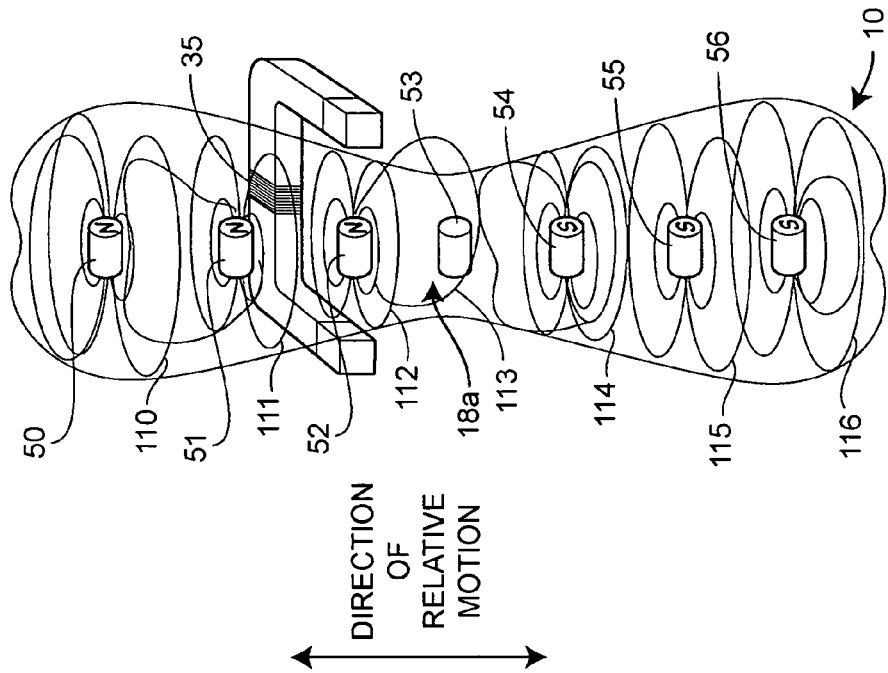
FIG. 4B is a free space diagram used to illustrate the overlapping flux fields generated by the discrete magnets of the discretized magnetic flux source and the resulting compound magnetic field gathered by the flux-gathering pole piece.
Figure 4A:
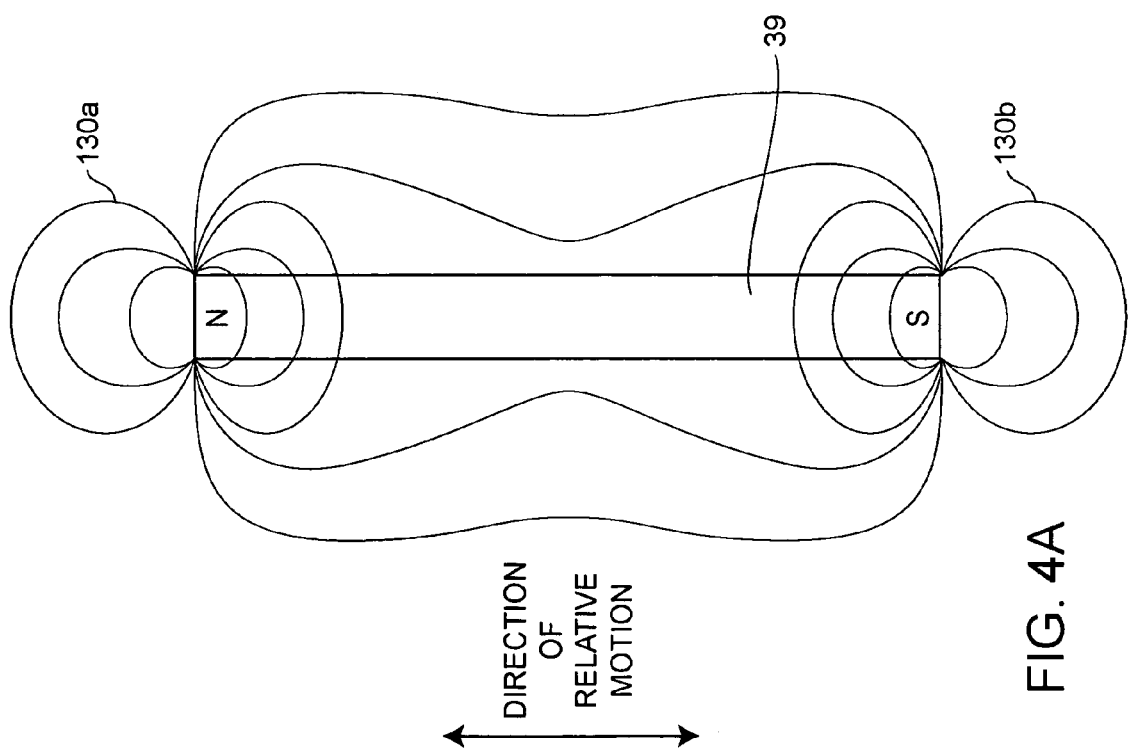
FIG. 4A is a free space diagram used to illustrate the nonlinear end effects of a single bar magnet placed as described in prior art and used as a magnetic flux source for rectilinear displacement measurement.

FIG. 4B is a free space diagram of a preferred embodiment using only seven discrete magnets 50–56 to graphically illustrate the magnetic fields 110–116 that combine to create the larger compound magnetic field 10. The following magnetic theory appropriately explains the relationship between the plurality of discrete magnets. As shown FIG. 4B, the individual magnetic fields 110–116 not only envelop the discrete magnets 50–56 from which they originate, but also provide intersecting flux lines for adjacent magnets. The overlapped flux regions additively combine to produce a larger predefined magnetic field 10 that defines the entire magnetic flux source. In a preferred embodiment, the polar axis of each discrete magnet 50–56 is oriented perpendicular to the direction of relative motion to facilitate "stacking" the sequential magnetic fields. By controlling the induction or strength of each discrete magnet 50–56 and placing them in a linear array, the discrete magnetic fields 110–116 additively combine to produce a programmable magnetic flux source that yields a predefined magnetic field 10.

As previously stated, each discrete magnet has a specific amount of magnetic "energy" or induction associated with it. Physical magnetic volume, magnet geometry, and magnet material characteristics all dictate how much magnetic energy can reside within the magnet. As known to those skilled in the art, each discrete magnet's induction can be programmed or calibrated using a conventional magnet treater such as the Model 990C Magnetreater® made by Magnetic Instrumentation, Inc. of Indianapolis, Ind. All of the aforementioned magnet characteristics are considered when using the Model 990C Magnetreater®. Table 2, shown below, provides the values of induction for the linear array depicted in FIG. 3A.

TABLE 2

| Magnet Number | Target (Gauss) |
| --- | --- |
| 50 | 465.6 |
| 51 | 465.6 |
| 52 | 344.5 |
| 53 | 288.7 |
| 54 | 258.4 |
| 55 | 218.8 |
| 56 | 186.2 |
| 57 | 142.0 |
| 58 | 121.1 |
| 59 | 76.8 |
| 60 | 46.6 |
| 61 | 0 |
| 62 | −46.6 |
| 63 | −76.8 |
| 64 | −121.1 |
| 65 | −142.0 |
| 66 | −186.2 |
| 67 | −218.8 |
| 68 | −258.4 |
| 69 | −288.7 |
| 70 | −344.5 |
| 71 | −465.6 |
| 72 | −465.6 |

As previously stated and shown in Table 2 the induction values of sequential magnets vary in graduated amounts to create the magnetic field 10 of magnetic flux source 18a. A discrete magnet 61 is located in the geometric center of the array and is programmed to zero gauss to provide a magnetic null for absolute reference during instrument calibration. Further, to provide absolute displacement measurement, the discrete magnets 50–72 are of opposite polarity on each side of the magnetic null. This polarity difference is detected by the electronic circuit 13 (not shown in FIG. 4B) and is used by the remotely operated instrument 19 as an absolute position measurement. As known, the opposite arithmetic sign in the value of Table 2 denotes the polarity change. Conventionally, positive values are assigned to relative displacements above the magnetic null and negative values are assigned to relative displacements below the magnetic null. Although the preferred embodiment teaches a position sensor with a linear output relationship, it should be appreciated that the inherent programmability of the magnetic flux source can provide numerous position sensor output signal travel relationships without modifying the sensor assembly electronics. The unique characteristics of the discretized magnetic flux source provide efficient adaptation to various forms of displacement measurement as well. The adaptations are explained in greater detail in the alternate embodiments described below.

In another embodiment of the rectilinear application, repositioning the discrete magnets within the magnetic flux source controls the interactions. As previously mentioned, the preferred embodiment relies upon programming the induction of adjacent discrete magnets to create a predefined output signal. Referring back to FIGS. 1A–1D, physical position within the magnetic field determines the measured strength of that field. Similarly, by creating space or distance between the adjacent magnets, the apparent strength of the discrete magnets, and therefore their interactions, can be controlled.

Figure 5A:
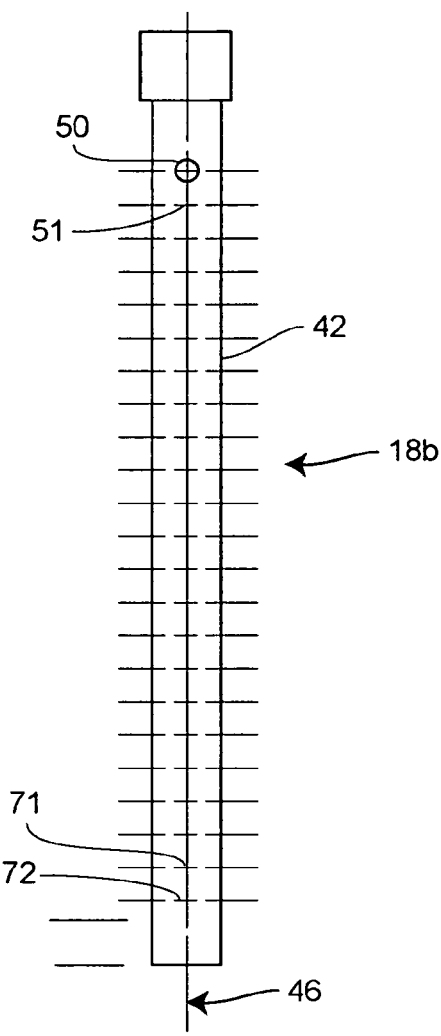
FIG. 5A is an illustrative side view of a cylindrical magnet carrier labeled to show equidistant vertical spacing of helically oriented discrete magnets in the magnetic flux source for a 4.5 inch rectilinear travel position sensor.

FIG. 5A is a side view of an alternate embodiment. The discrete magnets 50–72 of magnetic flux source 18b are again spaced equidistantly along the longitudinal axis 46 of the carrier 42. Discrete magnets 50–72 are approximately 0.125 inches in diameter and 0.462 inches in length. The carrier 42 is adapted to receive the discrete magnets 50–72 with a center-to-center spacing of approximately 0.25 inches. The magnetic field interactions are controlled by helically orienting or rotating the discrete magnets 50–72 about the longitudinal axis 46 of the magnetic flux source 18b. As known, by increasing space away from a magnet in any direction, the apparent strength of the magnet will decrease. In this alternate embodiment, providing precise angular displacement between the adjacent magnets about the longitudinal axis controls the interactions between adjacent magnetic fields. In this alternate embodiment, the sensor assembly 11 (not shown) is the same as explained in detail in the preferred embodiment. Thus, through calculated placement of discrete magnets 50–72, a predefined output signal can be generated.

Figure 5B:
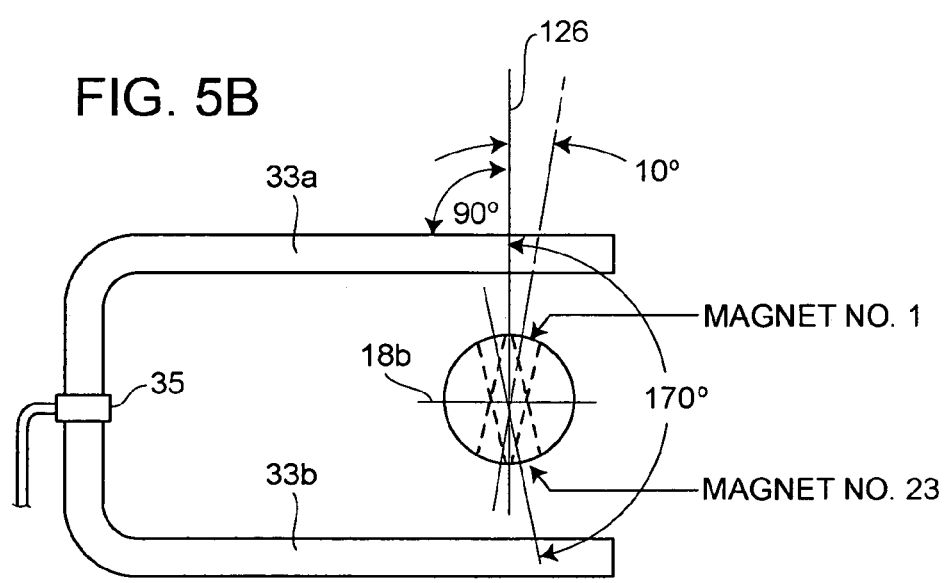
FIG. 5B is an illustrative top view of the helically oriented discrete magnet array for a rectilinear position sensor that shows the angular rotation of the discrete magnets within the magnetic flux source and the lateral position and the insertion depth of the magnetic flux source within the sensor assembly.

FIG. 5B is a top view of the helically oriented magnetic flux source 18b for a rectilinear position sensor. The illustration shows the rotation reference plane 126 for the discrete magnets 50–72. The magnetic flux source 18b is approximately centered between the first and second L-shaped sections 33a and 33b of the flux-gathering pole piece 32. Table 3, shown below, provides an example of the rotational angles required to achieve a substantially linear output from the sensor assembly 11 (not shown) with all the discrete magnets 50–72 programmed to approximately 457 Gauss.

TABLE 3

| Magnet Number | Rotation Angle (degrees) |
| --- | --- |
| 50 | 10 |
| 51 | 43 |
| 52 | 70 |
| 53 | 71 |
| 54 | 71 |
| 55 | 74.5 |
| 56 | 79 |
| 57 | 80 |
| 58 | 82 |
| 59 | 85 |
| 60 | 89 |
| 61 | 90 |
| 62 | 91 |
| 63 | 95 |
| 64 | 98 |
| 65 | 100 |
| 66 | 101 |
| 67 | 106 |
| 68 | 109 |
| 69 | 109 |
| 70 | 110 |
| 71 | 137 |
| 72 | 170 |

Figure 6:
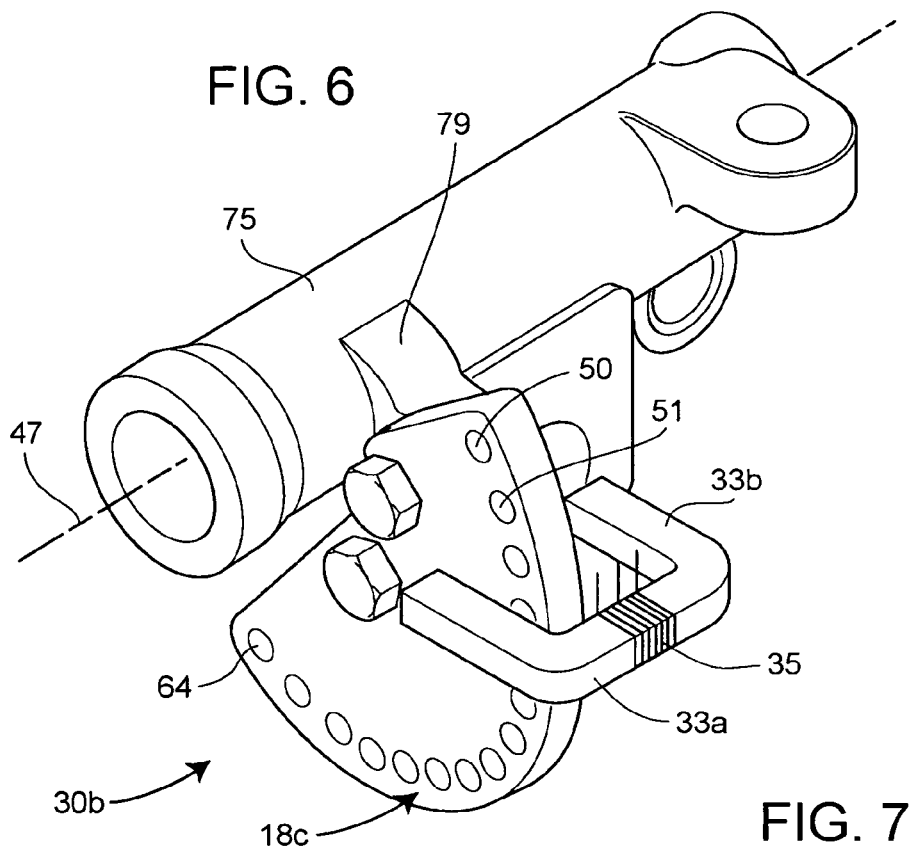
FIG. 6 is an illustrative perspective view of a rotary position sensor coupled to a rotary shaft where the plurality of discrete magnets comprising the rotary magnetic flux source are positioned with uniform angular distribution about the axis of rotation.

Another embodiments of the position sensor is shown in FIG. 6. A rotary non-contact position sensor 30b is constructed using similar techniques described in the preferred embodiment. Fifteen discrete of magnets 50–64 are aligned in a sector-shaped carrier 43 with a uniform angular distribution of six degrees. The sector-shaped carrier is mounted perpendicular to the axis of rotation 47 to create the rotary magnetic flux source 18c. Again, the sector-shape carried 43 is preferably made from aluminum. The rotary magnetic flux source 18c is directly couple to a rotary shaft 75 by a rotary mounting assembly 79. The L-shape sections 33a and 33b of the flux-gathering pole piece, the magnetic sensor 35, and discrete magnets 50–64 are the same as explained above. Table 4, shown below, provides the value of induction for the rotary magnetic flux source 18c depicted in FIG. 6.

TABLE 4

| Magnet Number | Target (Gauss) |
| --- | --- |
| 50 | 465.6 |
| 51 | 226.3 |
| 52 | 179.3 |
| 53 | 155.0 |
| 54 | 110.3 |
| 55 | 82.9 |
| 56 | 38.6 |
| 57 | 0.0 |
| 58 | −38.6 |
| 59 | −82.9 |
| 60 | −110.3 |
| 61 | −155.0 |
| 62 | −179.3 |
| 63 | −226.3 |
| 64 | −465.6 |

The rotary position sensor 30b shown in FIG. 6 provides a linear relationship between rotary travel and sensor output through controlled calibration of the induction of each discrete magnets 50–64. The linear output operating characteristics are provided through 90 degrees of rotation.

Figure 7A:
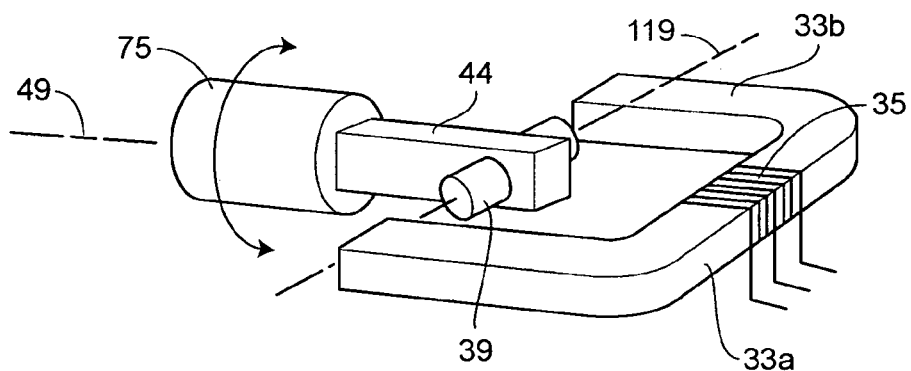
FIG. 7A is an illustrative perspective view of an end-mounted rotary position sensor where the cylindrical magnetic flux source is rotated between legs of the flux-gathering pole piece.

The principles described herein may also be applied to a rotational position sensor 30c with an extended linear operating range. Using the same L-shaped sections 33a and 33b of the flux-gathering pole piece 32 and the magnetic sensor as described above with reference to FIG. 2C, a single cylindrical bar magnet 39 can be used as the magnetic flux source for the position senor. As shown in FIG. 7A, the rotary sensor 30c is designed to provide an output that varies in a linear manner. The cylindrical magnet 39 is rotated between the first second L-shaped sections 33a and 33b of the flux-gathering pole piece 32 to provide a substantially linear output signal. Maximum linearity is achieved through proper selection of magnet length. With respect to the flux-gathering pole piece 32, the optimal length for the cylindrical magnet 39 is essentially two-thirds the width of the gap between the L-shaped sections of the flux-gathering pole piece 32. For example, using the flux-gathering pole piece 32 of the preferred embodiment with an internal width of approximately 0.59 inches, the cylindrical magnet 39 will have a length of approximately 0.385 inches. In this alternate embodiment, the diameter of the cylindrical magnet 39 is approximately 0.1875 inches. As shown, the carrier 44 attaches the cylindrical magnet 39 to the rotating shaft 75. The carrier 44 is adapted to attach to the cylindrical magnet 39 about axis 49 of the rotating shaft 75. Furthermore, the cylindrical magnet 39 is inserted about 0.3125 inches past the opening of the flux-gathering pole piece 32.

Figure 7B:
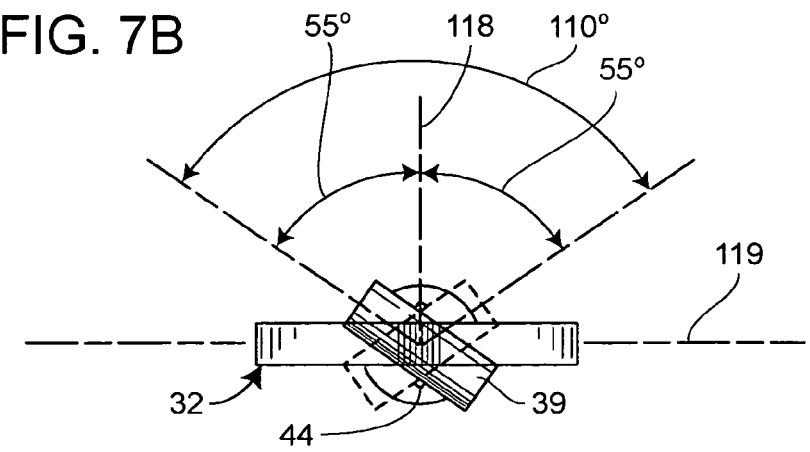
FIG. 7B is an illustrative end view showing the reference sensing plane and the maximum angular rotation for the end-mounted rotary position sensor exhibiting linear output characteristics.

As shown in FIG. 7B, the linear output operating characteristics are provided through 110 degrees of rotation whereby the rotation is symmetrically distributed about a plane 119 bisecting the first and second L-shaped sections 33a and 33b of the flux-gathering pole piece 32. The bisecting plane 119 is oriented at a right angle to the sensing plane 118 of the magnetic sensor.

Several implementations of a position sensor utilizing a single Hall Effect sensor have been shown and described above. Many modifications and variations may be made in the techniques and structures described and illustrated above. For example, a magnetic shunt constructed of ferromagnetic material could be placed adjacent to or completely surrounding each discrete magnet to selectively reduce its magnetic field and therefore control its effect on subsequent magnets. Additionally, non-uniform spacing between individual magnets or variable magnet length could also be used.

Further, as shown in the embodiments of FIGS. 8-11, a secondary Hall Effect sensor can be added to the U-shaped flux-gathering pole employed in a single Hall Effect non-contact proximity sensor. Referring next to FIG. 8, a sensor assembly 200 is mounted in a sensor housing 212. A U-shaped flux-gathering pole 214 is positionally aligned by the sensor housing 212. As explained more fully above, the U-shaped flux gathering pole 214, which includes a first L-shaped section 216, and a second L-shaped section 218, is placed in close proximity to a magnetic flux source. The magnetic flux source may take the form of, for example, a rectangular-shaped carrier retaining a plurality of discrete cylindrical magnets (as shown in FIG. 3A), which may be used to facilitate detection by the sensor assembly 210 of rectilinear position and travel. Alternate arrangements for the magnetic flux source are also possible. For example, to facilitate detection of rotary position and travel, the magnetic flux source may take the form of a sector-shaped carrier retaining a plurality of discrete magnets (as shown in FIG. 6), preferably arranged in a uniform angular distribution.

Figure 9:
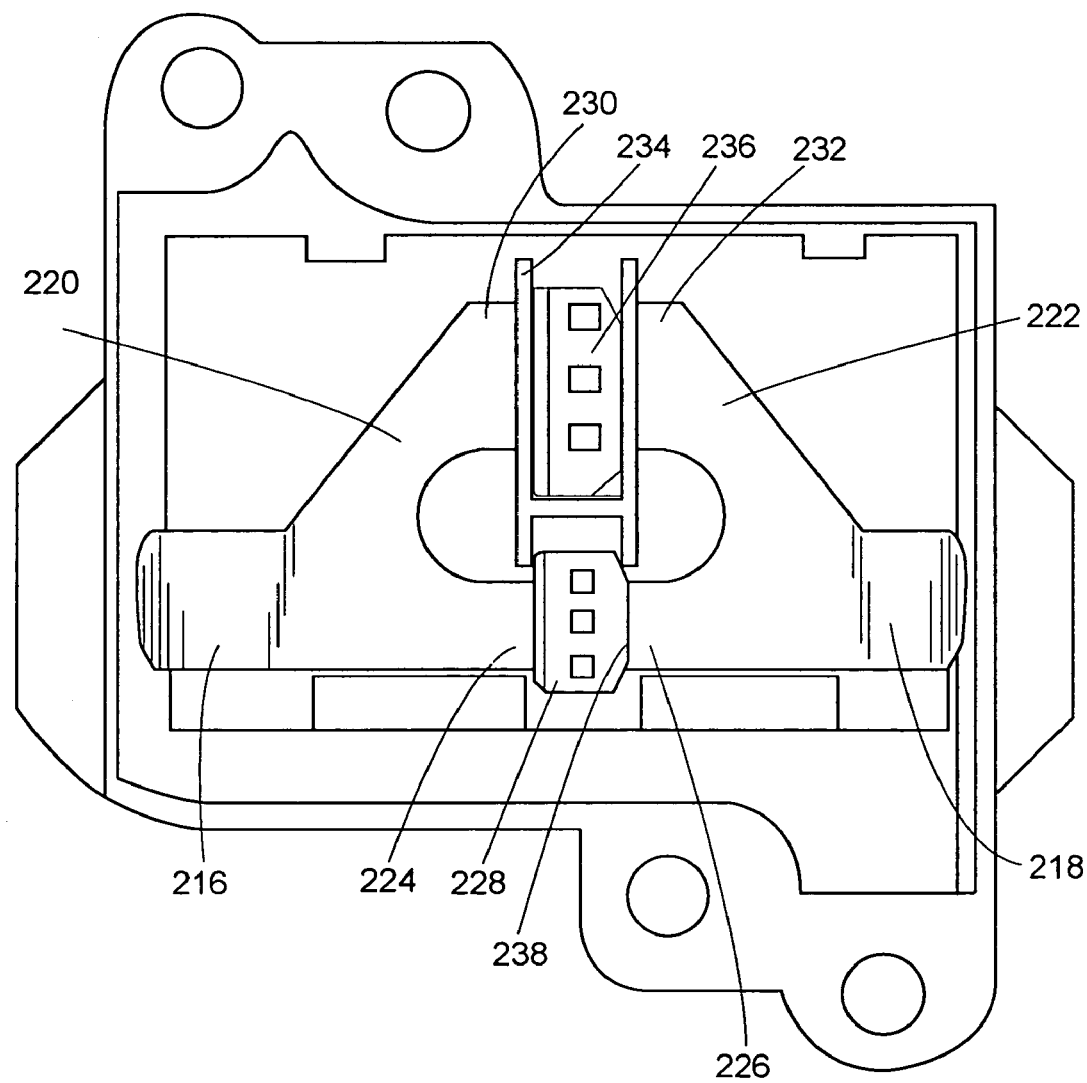
FIG. 9 is a plan view, taken along lines 9—9 of FIG. 8.

As best illustrated in FIG. 9, within the sensor housing 212, the first L-shaped section 216 and the second L-shaped section 218 terminate at asymmetric Y-shaped portions 220, 222, respectively. The asymmetric Y-shaped portions 220, 222 each have a first end 224, 226, respectively. A primary Hall Effect sensor 228 is located between the first ends 224, 226 of the Y-shaped portions 220, 222 of the first and second L-shaped sections 216, 218 of the U-shaped flux gathering pole 214. The surface 238 of the primary sensor 228 that contacts the L-shaped portion 218 is preferably branded.

Each of the asymmetric Y-shaped portions 220, 222 is further provided with a second end 230, 232, respectively. Both the first ends 224, 226 and the second ends 230, 232 are located at a head end of the respective Y-shaped portions 220, 222. The sensor housing 212 is preferably further provided with an adapter 234, which is made of an electrically insulating material such as plastic, but through which magnetic flux may travel. As best shown in FIG. 9, a secondary sensor 236 and the adapter 234 are positioned between the second ends 230, 232 of the asymmetric Y-shaped portions 220, 222. Like the primary sensor 228, the secondary sensor 236 is a Hall Effect sensor, with at least one sensing element therein arranged normal to the first and second ends 224, 226, 230, 232 of the asymmetric Y-shaped portions 220, 222, so as to be oriented normal to the direction of flux from the U-shaped flux gathering pole 214.

By providing the asymmetric Y-shaped portions 220, 222 with a primary sensor 228 positioned between the first and second ends 224, 226, and with a secondary sensor 236 positioned, with an adapter 234, between first and second ends 230, 232, some flux is effectively shunted away from the primary sensor 228 and detected by the secondary sensor 236. The secondary sensor 236, which can be used as a limit switch detection element in a limit switch circuit, provides increased reliability over a single-sensor non-contact position sensor, and also advantageously avoids the need for two limit switches at either end of the travel of a valve stem.

Advantageously, the adapter 234 creates an air gap between the secondary sensor 236 and the second ends 230, 232 of the asymmetric Y-shaped portions 220, 222, thereby creating a lossy magnetic coupling with the secondary sensor 236. By controlling the spacing in the air gap, as well as other components of the magnetic circuit, such as pole end piece surface area, the magnitude of the flux experienced in both the primary sensor 228 and secondary sensor 236 can be controlled respectively.

It has been found that an air gap on the order of approximately 0.13 inch provides an output of the secondary sensor 236 on the order of 40 to 50 percent of the output of the primary sensor 228, which is a satisfactory output for the secondary sensor 236 when used as a limit switch. Again, by varying the dimensions of the adapter, the size of the air gap, or the material of the adapter, the relative outputs of the primary sensor 228 and secondary sensor 236 are effected. Thus, in those applications in which the primary sensor 228 is used primarily as a position sensor and the secondary sensor 236 is used as a limit switch, it is preferable that the primary sensor 228 experience a larger percentage of magnetic flux from the U-shaped flux gathering pole 214 than the secondary sensor 236, so the respective dimensions and materials are selected so as to produce this desired result.

Figure 10:
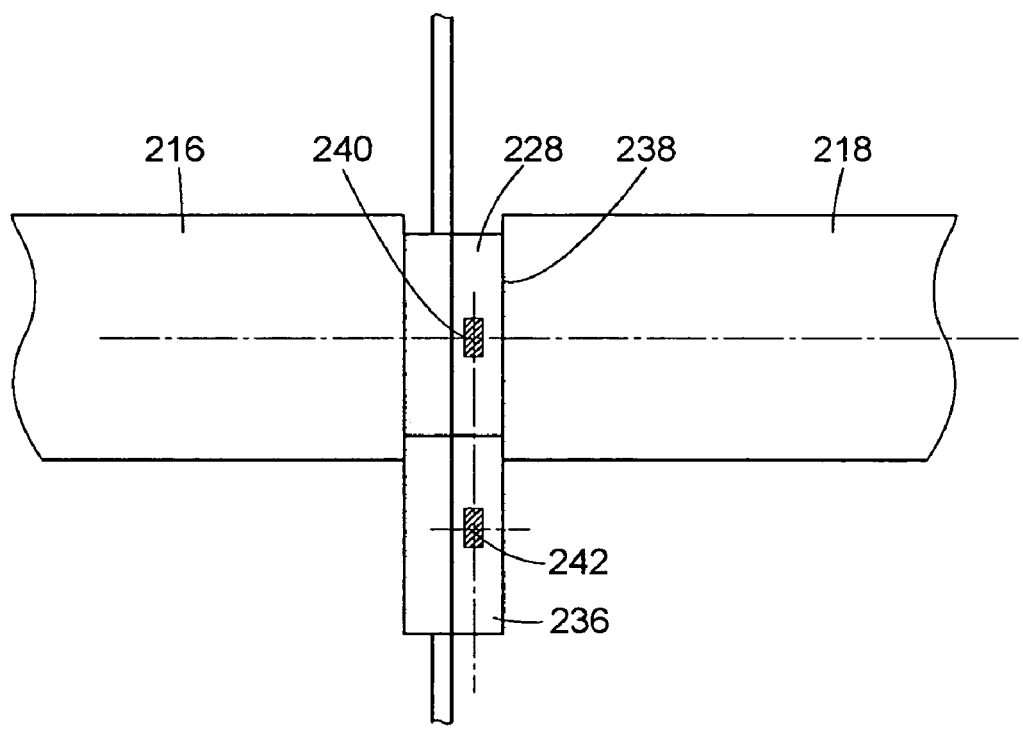
FIG. 10 is an enlarged plan view of an alternate arrangement of primary and secondary Hall Effect sensors for a non-contact position sensor.

In other embodiments, the secondary sensor 236 may be positioned relative to the primary sensor 228 such that there is no need to alter the ends of the L-shaped sections 216, 218 of the U-shaped flux gathering pole. Turning now to FIG. 10, the primary sensor 228 is shown positioned between the ends of the L-shaped sections 216, 218, and the surface 238 of the primary sensor 228, which is in contact with the L-shaped section 218, is preferably branded. In this embodiment, the secondary sensor 236 is aligned immediately adjacent to the primary sensor 228, such that the ends of the primary and secondary sensors 228, 236 are preferably touching.

Figure 11:
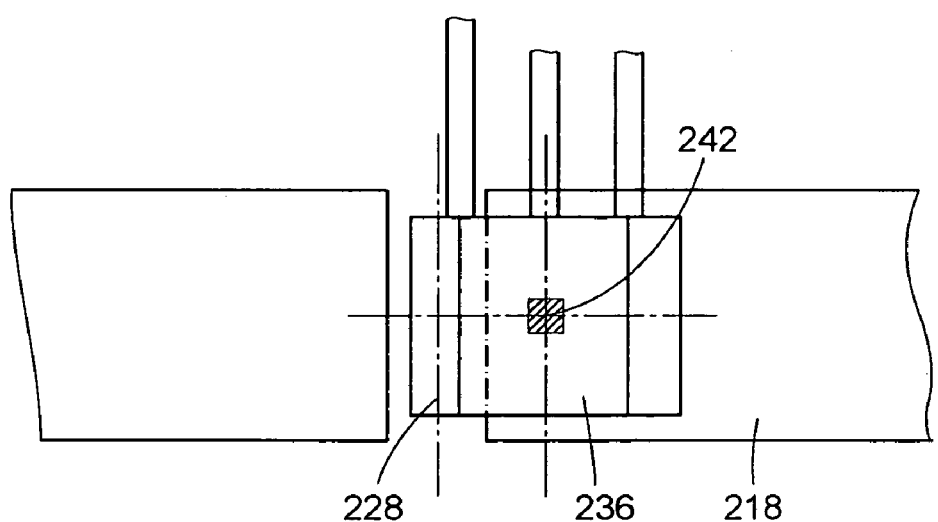
FIG. 11 is an enlarged plan view of another alternate arrangement of primary and secondary Hall Effect sensors for a non-contact position sensor.

Instead of shunting flux away from the primary sensor 228 in order for the secondary sensor to experience flux as in the previous embodiment, the secondary sensor 236 of the embodiment of FIG. 10 (as well as the secondary sensor 236 of the further alternate embodiment of FIG. 11) detects leakage flux near the primary sensor 228. For this reason, it is desirable for the secondary sensor 236 to be disposed in the highest leakage flux path, which is as close to the primary sensor 228 as possible.

The Hall Effect sensing elements 240, 242 of the primary sensor 228 and secondary sensor 236, respectively, are aligned with one another and are oriented normal to the ends of the L-shaped portions 216, 218. With the ends of the primary sensor 228 and secondary sensor 236 touching, the sensing elements 240, 242 can advantageously be as close as approximately 0.112 inch to one another, which substantially maximizes detection of the leakage flux near the primary sensor 228 by the sensing element 242 of the secondary sensor 236 when the primary and secondary sensing elements 228, 236 are arranged in the same plane.

Turning now to FIG. 11, in a further alternate embodiment, the secondary sensor 236 is oriented perpendicularly to the primary sensor 228. In this embodiment, the sensing element 242 of the secondary sensor 236 is even closer to the sensing element (not shown) of the primary sensor 228. It is found that by arranging the secondary sensor 236 such that an unbranded surface of the secondary sensor 236 is placed in intimate, flat contact with the bottom surface of the L-shaped portion 218 of the U-shaped flux gathering pole, the sensing element 242 of the secondary sensor 236 can be as close as approximately 0.063 inch to the Hall Effect sensing element of the primary sensor 228. In this alternate embodiment, due to the closer proximity of the sensing elements of the primary and secondary sensors 228, 136, and more particularly, due to the placement of the secondary sensor 236 in a path of higher leakage flux, an even greater output voltage is attained by the secondary sensor 238 as compared to the second sensor of the embodiment of FIG. 10.

Figure 12:
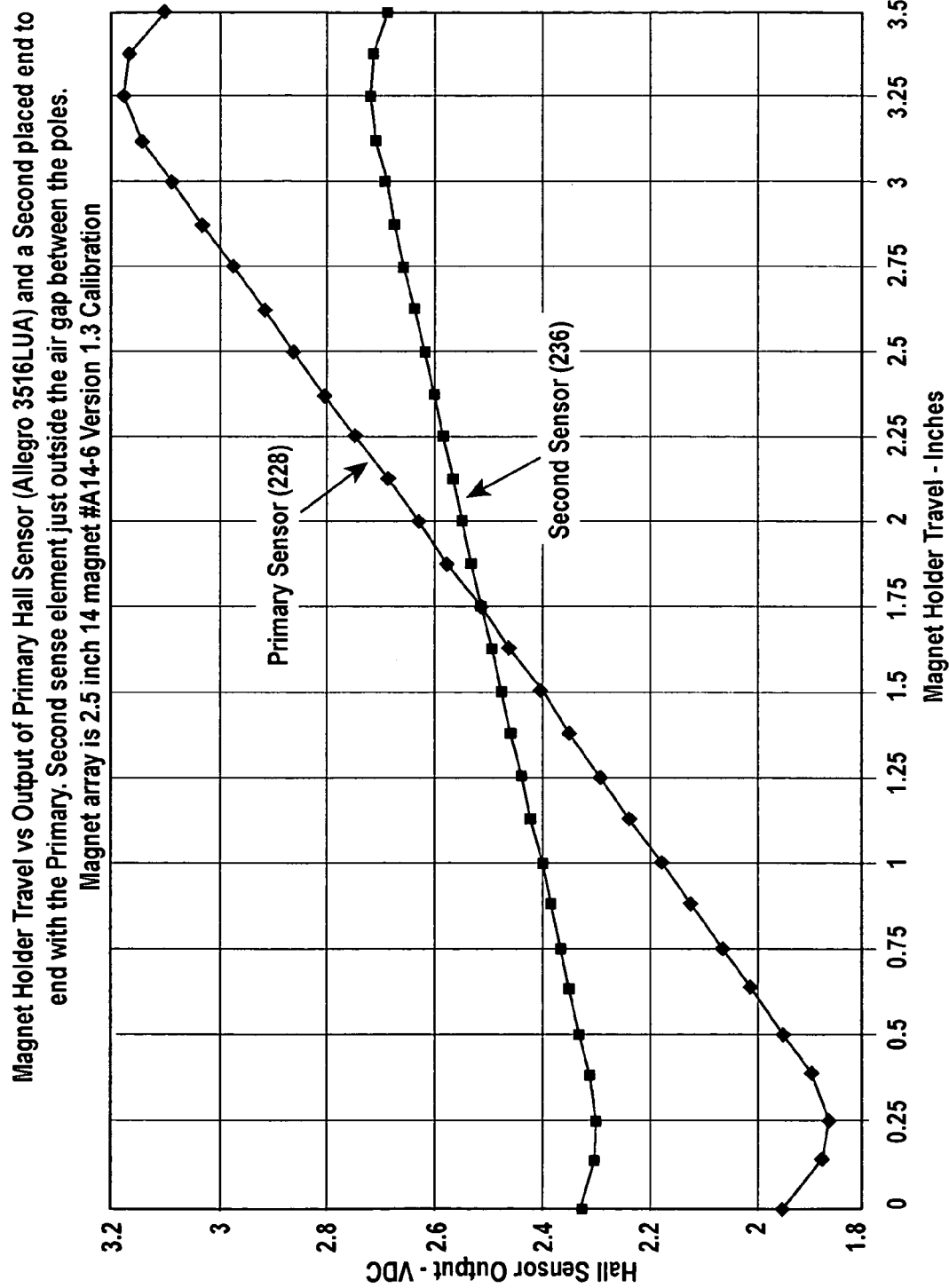
FIG. 12 is a plot of Hall Sensor output (in volts dc) against magnet holder travel, demonstrating the relative outputs of primary and secondary Hall Effect sensors arranged in accordance with an embodiment in response to various positions along the travel of a linear translator representing an exemplary stroke of a valve plug or valve stem.

FIG. 12 is a graphical representation of an exemplary valve stem travel that is monitored utilizing primary and secondary sensors according to one of the embodiments disclosed herein, wherein the voltage outputs of the primary sensor 228 and secondary sensor 236 are displayed in volts DC, and the travel, or displacement, of the valve stem, represented by linear movement of a magnetic flux source in the form of a rectangular-shaped carrier (or "magnet holder") is displayed in inches. As illustrated by the graphical representation, the voltage output of the secondary sensor 236 is proportional to the voltage output of the primary sensor 228.

Alternatively, one may place the secondary sensor 236 in any other desired location, but preferably in a high flux path. I.e., instead of or in addition to the secondary sensor experiencing leakage flux, the secondary sensor may be positioned in a secondary flux path. Thus, one may utilize the pole configuration to form an additional leakage flux path to be detected by the secondary sensor, or to form an entirely separate flux path to be detected by the secondary sensor. Also, the secondary sensor may be used for other purposes in a control circuit besides a limit switch.

As indicated schematically in FIG. 13, the primary sensor 228 and secondary sensor 236 are preferably placed in communication with a voltage detector 250 that detects voltage across the sensing elements 240, 242 in each of the primary and secondary sensors 228, 236. The voltage detector 250 may communicate with a processor 252, which includes a memory 254 that stores one or more predetermined voltages against which the detected voltage output or outputs may be compared. The processor may be further adapted to include an output signal generator 256, which generates a signal upon determination by the processor 252 of a selected proximity of the detected voltage output or outputs to the one or more predetermined voltages stored in the memory 254. A controller 258 receiving the signal can then initiate one or more appropriate control sequences in response.

It will be recognized by those of ordinary skill in the art that the various embodiments described above are for purposes of explanation and are not intended to limit the scope of this disclosure. For example, while the embodiments disclosed herein are directed to detecting travel of valve stems, it is recognized that the teachings herein are likewise applicable to other situations in which it is desired to reliably detect position and/or reliably limit travel of an object without physical contact and without the need for multiple electro-mechanical limit switches or the like.

The invention claimed is:

1. A position sensor assembly comprising:
a magnetic circuit including a first pole piece and a second pole piece;
a primary sensor disposed between the first and second pole pieces, wherein said first and second pole pieces form a primary flux path through the primary sensor and permit a leakage flux path outside the primary sensor; and
a secondary sensor disposed in the leakage flux path, and being perpendicularly arranged to the primary sensor, wherein said leakage flux path provides a leakage flux through the secondary sensor to produce a voltage output from the secondary sensor proportional to a voltage output of the primary sensor produced by the primary flux of the primary flux path.

2. The position sensor assembly of claim 1, further comprising a voltage detector in electrical communication with the primary sensor and the secondary sensor.

3. The position sensor assembly of claim 2, further comprising a processor in communication with the voltage detector, said voltage detector being adapted to send a detected voltage output of the primary sensor and of the secondary sensor to the processor;
said processor including one or more predetermined voltages stored in an associated memory; and
said processor comparing at least one of the voltage outputs of the primary sensor and the secondary sensor to said one or more predetermined voltages and said processor being adapted to generate a signal upon a selected proximity of the at least one voltage output to the one or more predetermined voltages.

4. The position sensor assembly of claim 1, wherein the first pole piece is generally in an L-shape and the second pole piece is generally in an L-shape, with the first and second pole pieces arranged to form a generally U-shaped flux gathering pole.

5. The position sensor assembly of claim 4, wherein the primary sensor is positioned between an end of each of the first and second pole pieces.

6. The position sensor assembly of claim 5, wherein a branded surface of the primary sensor is in contact with the end of at least one of the first and second pole pieces.

7. A position sensor assembly, comprising:
a primary sensor including at least one Hall Effect sensing element being responsive to magnetic fields;
a secondary sensor including at least one Hall Effect sensing element being responsive to magnetic fields;
a U-shaped flux-gathering pole piece for collecting and directing magnetic flux at least to the primary sensor, the flux-gathering pole piece being constructed by the symmetric placement of a first and a second L-shaped section of magnetically permeable material forming a U-shape with a bifurcated base, the bifurcated base of the U-shaped pole piece having a gap separating the first and second L-shaped sections wherein the first L-shaped section further comprises a first asymmetric Y-shaped portion extending from the first L-shaped section, the first asymmetric Y-shaped portion having a head including first and second ends extending in a direction of the second L-shaped section and a second asymmetric Y-shaped portion having a head including first and second ends asymmetric Y-shaped portion having a head including first and second ends extending in a direction of the first L-shaped section, said primary sensor being arranged between the first ends of the first and second asymmetric Y-shaped portions and said secondary sensor being arranged between the second ends of the first and second asymmetric Y-shaped portions; and
a magnetic flux source for generating a magnetic field that varies in a substantially linear manner.

8. The position sensor assembly of claim 7, further comprising an adapter disposed between the secondary sensor and the second ends of the first and second asymmetric Y-shaped portions.

9. The position sensor assembly of claim 8, wherein the adapter is comprised of an electrically insulating material.

10. The position sensor assembly of claim 9, wherein the electrically insulating material is plastic.

11. The position sensor assembly of claim 7, wherein the secondary sensor is positioned immediately adjacent the primary sensor, and wherein the Hall Effect sensing element of the primary sensor and the Hall Effect sensing element of the secondary sensor are aligned with one another and are oriented normal to the ends of the L-shaped portions.

12. The position sensor assembly of claim 7, wherein the secondary sensor is positioned perpendicularly to the primary sensor, and wherein the Hall Effect sensing element of the secondary sensor is perpendicular to the Hall Effect sensing element of the primary sensor, whereby a distance separating the Hall Effect sensing elements of the primary and secondary sensors is minimized.

13. A position sensor assembly comprising:
a sensor housing;
a U-shaped pole piece aligned by the sensor housing, said U-shaped pole piece including a first L-shaped section and a second L-shaped section, wherein the first L-shaped section terminates at an asymmetric Y-shaped portion and the second L-shaped section terminates at a second asymmetric Y-shaped portion;
a primary sensor positioned between a first end of each of the first and second asymmetric Y-shaped portions, said first end of each of the first and second asymmetric Y-shaped portions being at a head of the respective asymmetric Y-shaped portion; and
a secondary sensor positioned between a second end of each of the first and second asymmetric Y-shaped portions, said second end of each of the first and second asymmetric Y-shaped portions also being at the head of the respective asymmetric Y-shaped portion.

14. The position sensor assembly of claim 13, wherein the primary sensor includes at least one sensing element arranged normal to the first ends of the first and second asymmetric Y-shaped portions.

15. The position sensor assembly of claim 14, wherein the secondary sensor includes at least one sensing element arranged normal to the second ends of the first and second asymmetric Y-shaped portions.

16. The position sensor assembly of claim 13, further comprising:
an adapter disposed between the secondary sensor and at least the second end of one of the first and second L-shaped sections.

17. The position sensor assembly of claim 16, wherein the adapter is comprised of an electrically insulating material.

18. The position sensor assembly of claim 17, wherein the electrically insulating material is plastic.

19. The position sensor assembly of claim 16, wherein the adapter is positioned between the secondary sensor and the second ends of both of the first and second asymmetric Y-shaped portions.

20. The position sensor assembly of claim 19, wherein the adapter creates an air gap between the secondary sensor and the second ends of both of the first and second asymmetric Y-shaped portions.

21. The position sensor assembly of claim 20, wherein the air gap is approximately 0.13 inch.

22. The position sensor assembly of claim 13, wherein the secondary sensor operates as a limit switch, and said primary sensor is arranged to experience a larger percentage of magnetic flux from the U-shaped pole piece than the secondary sensor.

23. A position sensor assembly comprising:
a first pole piece;
a second pole piece;
a primary sensor disposed between the first and second pole pieces, wherein said first and second pole pieces form a primary flux path through the primary sensor and permit a leakage flux path outside the primary sensor; and
a secondary sensor disposed in the leakage flux path, wherein the secondary sensor is at least one of aligned immediately adjacent to the primary sensor and in contact with the primary sensor.

24. A position sensor assembly comprising:
a first pole piece;
a second pole piece;
a primary sensor disposed between the first and second pole pieces, wherein said first and second pole pieces form a primary flux path through the primary sensor and permit a leakage flux path outside the primary sensor; and
a secondary sensor disposed in the leakage flux path, wherein the secondary sensor is arranged perpendicularly to the primary sensor.

25. A position sensor assembly comprising:
a first pole piece;
a second pole piece;
a primary sensor disposed between the first and second pole pieces, wherein said first and second pole pieces form a primary flux path through the primary sensor and permit a leakage flux path outside the primary sensor;
a secondary sensor disposed in the leakage flux path;
a voltage detector in electrical communication with the primary sensor and the secondary sensor; a processor in communication with the voltage detector, said voltage detector being adapted to send a detected voltage output of the primary sensor and of the secondary sensor to the processor; said processor including one or more predetermined voltages stored in an associated memory wherein said processor compares at least one of the voltage outputs of the primary sensor and the secondary sensor to said one or more predetermined voltages and said processor being adapted to generate a signal upon a selected proximity of the at least one voltage output to the one or more predetermined voltages.

* * * * *

UNITED STATES PATENT AND TRADEMARK OFFICE
CERTIFICATE OF CORRECTION

PATENT NO. : 7,190,159 B2 Page 1 of 1
APPLICATION NO. : 10/779686
DATED : March 13, 2007
INVENTOR(S) : Curt Galbreath et al.

It is certified that error appears in the above-identified patent and that said Letters Patent is hereby corrected as shown below:

On the Title Page;

Item: [56], Other Publications, 3$^{rd}$ reference, "on" should be -- of --.

At Column 11, line 53, "embodiments" should be -- embodiment --.

At Column 11, line 60, "carried" should be -- carrier --.

At Column 11, line 62, "couple" should be -- coupled --.

At Column 16, lines 46-48, "portion having a head including first and second ends asymmetric Y-shaped portion having" should be -- portion extending from the second L-shaped section, the second asymmetric Y-shaped portion having --.

Signed and Sealed this

Seventh Day of April, 2009

JOHN DOLL
*Acting Director of the United States Patent and Trademark Office*